US011873682B2

(12) United States Patent
Brown

(10) Patent No.: US 11,873,682 B2
(45) Date of Patent: Jan. 16, 2024

(54) LIGHT ABSORBING AND LIGHT EMITTING DEVICES, LIGHT ADMITTING ASSEMBLIES, AND METHODS OF ABSORBING AND EMITTING LIGHT

(71) Applicant: James F. Brown, Clifton, VA (US)

(72) Inventor: James F. Brown, Clifton, VA (US)

(73) Assignee: James F. Brown, Clifton, VA (US)

( * ) Notice: Subject to any disclaimer, the term of this patent is extended or adjusted under 35 U.S.C. 154(b) by 122 days.

(21) Appl. No.: 16/366,276

(22) Filed: Mar. 27, 2019

(65) Prior Publication Data

US 2020/0308906 A1 Oct. 1, 2020

(51) Int. Cl.

*E06B 9/42* (2006.01)
*F21K 2/00* (2006.01)
*E06B 9/60* (2006.01)
*E06B 9/24* (2006.01)

(52) U.S. Cl.

CPC .................. *E06B 9/42* (2013.01); *F21K 2/00* (2013.01); *F21K 2/005* (2013.01); *E06B 9/60* (2013.01); *E06B 2009/2417* (2013.01)

(58) Field of Classification Search

CPC ...... E06B 9/40; E06B 9/42; E06B 2009/2417; E06B 9/30; F21K 2/00; F21K 2/005; A47H 23/00; A47H 99/00

See application file for complete search history.

(56) References Cited

U.S. PATENT DOCUMENTS

| | | | | |
|---|---|---|---|---|
| 4,195,680 A | | 4/1980 | Hyman et al. | |
| 4,336,834 A | * | 6/1982 | Schaller | E06B 9/386 160/168.1 R |
| 4,398,587 A | | 8/1983 | Boyd | |
| 4,486,073 A | | 12/1984 | Boyd | |
| 4,792,427 A | | 12/1988 | Reeves | |
| 4,799,526 A | | 1/1989 | Reeves | |
| 6,480,336 B2 | | 11/2002 | Digert et al. | |
| 6,714,352 B2 | | 3/2004 | Rogers et al. | |
| 8,104,921 B2 | | 1/2012 | Hente et al. | |

(Continued)

FOREIGN PATENT DOCUMENTS

| | | | | |
|---|---|---|---|---|
| DE | 202005002279 U1 | * | 6/2005 | E06B 9/40 |
| WO | WO-2007053408 A2 | * | 5/2007 | C09D 11/322 |

*Primary Examiner* — Abe Massad
*Assistant Examiner* — Jeremy C Ramsey
(74) *Attorney, Agent, or Firm* — Brown & Brown IP Law PLLC

(57) ABSTRACT

A light absorbing and light emitting device, comprising a first structure supported by a holder. A first portion of the first structure (which can be flexible, sheet-like and/or at least partially opaque) comprises phosphorescent material and/or phase change material on a first side. The first structure is movable relative to the holder between a first position, in which the first side faces a first direction, and a second position, in which the first side faces a second direction. Also, a light admitting, light absorbing and light emitting assembly that comprises a light absorbing and light emitting device and a first light-transmitting structure. Also, a light absorbing and light emitting device that comprises a holder assembly and a plurality of first structures, with phosphorescent and/or phase change material, and each movable between first and second positions. Also, methods of absorbing light and emitting light with such structures.

22 Claims, 18 Drawing Sheets

(56) References Cited

U.S. PATENT DOCUMENTS

| | | | | |
|---|---|---|---|---|
| 8,904,683 | B2 * | 12/2014 | Tornqvist | G09F 11/10 40/498 |
| 8,928,981 | B2 | 1/2015 | Whitehead | |
| 9,598,899 | B2 | 3/2017 | Spanjaard | |
| 9,677,331 | B2 * | 6/2017 | Rupel | E06B 9/64 |
| 2012/0043029 | A1 * | 2/2012 | Gaskill | E06B 9/42 160/121.1 |
| 2018/0023338 | A1 * | 1/2018 | Werner | E04F 10/08 160/167 R |
| 2018/0223596 | A1 * | 8/2018 | Hall | E06B 9/44 |

* cited by examiner

LIGHT ABSORBING AND LIGHT EMITTING DEVICES, LIGHT ADMITTING ASSEMBLIES, AND METHODS OF ABSORBING AND EMITTING LIGHT

FIELD OF THE INVENTIVE SUBJECT MATTER

The present inventive subject matter is directed to devices that absorb and emit electromagnetic energy, hereafter referred to broadly as light, assemblies that comprise such devices, and methods of absorbing and emitting light. In some embodiments, the present inventive subject matter is directed to shades and blinds for window, doors and other structures.

BACKGROUND

There is an ongoing effort to develop systems that are more energy-efficient and, in many cases, independent of public utilities. A large proportion (some estimates are as high as twenty-five percent) of the electricity generated in the United States each year goes to lighting, a large portion of which is general illumination (e.g., downlights, flood lights, spotlights and other general residential or commercial illumination products). Accordingly, there is an ongoing need to provide lighting that is more energy-efficient and/or that does not rely on solely on public utilities.

BRIEF SUMMARY OF THE INVENTIVE SUBJECT MATTER

In accordance with the present inventive subject matter, there are provided devices that are suitable for absorbing electromagnetic radiation (e.g., visible light, far infrared light, etc.) and later releasing such light. Specific examples of types of devices encompassed by the present inventive subject matter include window shades and window blinds (as well as shades and blinds for doors or any other light-transmitting structure) that comprise phosphorescent material that absorbs light and/or phase change material that absorbs energy (e.g., when exposed to light, e.g., during the daylight hours, e.g., by facing outward away from a room) and that emits light and/or heat at a later time (e.g., during the nighttime hours, e.g., by facing inward toward the room). Such light can be in the form of visible light or body-warming infrared light, including far infrared light.

In accordance with a first aspect of the present inventive subject matter, there is provided a light absorbing and light emitting device, comprising:

a first structure; and a holder, the first structure is supported by the holder, a first portion of the first structure comprises at least one phosphorescent material and/or at least one phase change material.

In accordance with a second aspect of the present inventive subject matter, there is provided a light absorbing and light emitting device, comprising:

a first structure; and a holder, the first structure is supported by the holder, at least a first portion of the first structure is flexible and sheet-like, the first portion of the first structure has a first side and a second side, the first portion of the first structure comprises at least one phosphorescent material and/or at least one phase change material, the first structure is movable relative to the holder at least between a first structure first position and a first structure second position, in the first structure first position, the first side of the first portion faces a first direction, in the first structure second position, the first side of the first portion faces a second direction, and the first direction differs from the second direction.

In accordance with a third aspect of the present inventive subject matter, there is provided a light absorbing and light emitting device, comprising:

a first structure; and a holder, the first structure is supported by the holder, at least a first portion of the first structure has a first side, the first portion of the first structure comprises at least one phosphorescent material and/or at least one phase change material, the first structure is movable relative to the holder at least between a first structure first position and a first structure second position, in the first structure first position, the first side of the first portion faces a first direction, in the first structure second position, the first side of the first portion faces a second direction, and the first direction differs from the second direction.

In accordance with a fourth aspect of the present inventive subject matter, there is provided a light admitting, light absorbing and light emitting assembly, comprising:

a first light-transmitting structure, a first structure; and a holder, the holder is fixed relative to the first light-transmitting structure, the first structure is supported by the holder, at least a first portion of the first structure has a first side, the first portion of the first structure comprises at least one phosphorescent material and/or at least one phase change material, the first structure is movable relative to the holder such that the first portion can be moved from a first portion first position to a first portion second position, in the first structure first position, the first side of the first portion faces the first light-transmitting structure, and in the first structure second position, the first side of the first portion faces away from the first light-transmitting structure.

In accordance with a fifth aspect of the present inventive subject matter, there is provided a method of absorbing light and emitting light, comprising:

moving a first structure from a first structure first position to a first structure second position, the first structure is supported by a holder, at least a first portion of the first structure has a first side, the first portion of the first structure comprises at least one phosphorescent material and/or at least one phase change material, in the first structure first position, the first side of the first portion faces a first direction, in the first structure second position, the first side of the first portion faces a second direction, and the first direction differs from the second direction.

In accordance with a sixth aspect of the present inventive subject matter, there is provided a light absorbing and light emitting device, comprising:

a plurality of first structures; and a holder assembly, each of the first structures is supported by the holder assembly, for each of the first structures:

at least a first portion of the first structure has a first side, the first portion of the first structure comprises at least one phosphorescent material and/or at least one phase change material, the first structure is movable relative to the holder assembly at least between a first structure first position and a first structure second position, in the first structure first position, the first side of the first portion faces a first direction, in the first structure second position, the first side of the first portion faces a second direction, and the first direction differs from the second direction.

The inventive subject matter may be more fully understood with reference to the accompanying drawings and the following detailed description of the inventive subject matter.

BRIEF DESCRIPTION OF THE DRAWING FIGURES

Figure 4A:
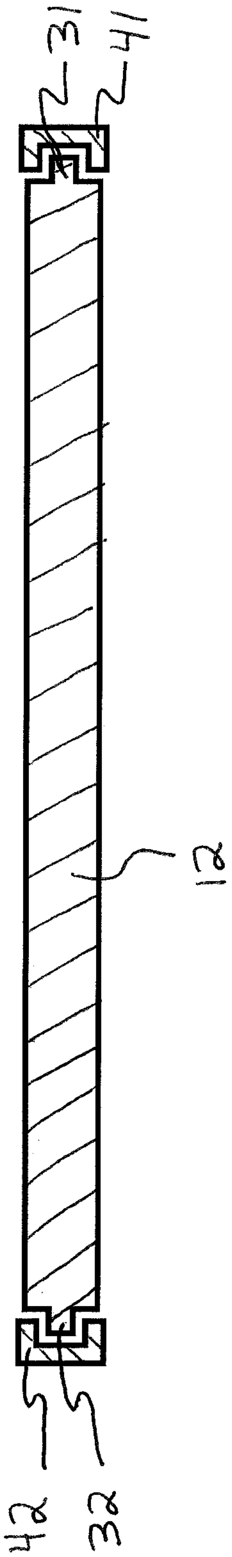

FIG. 4A is a schematic sectional view of a holder 12 held by a first receptacle 41 and a second receptacle 42.

Figure 4B:
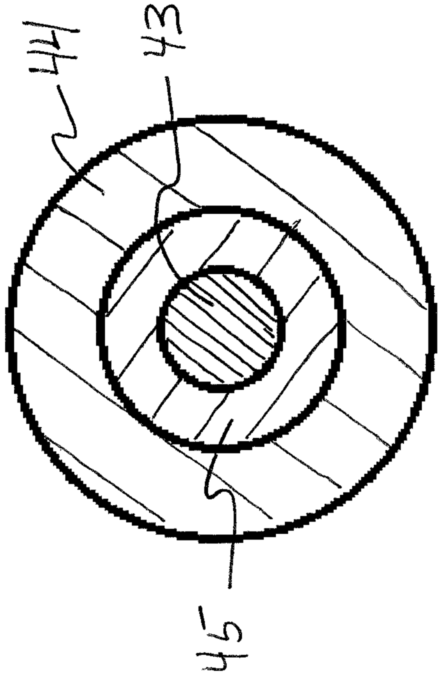

FIG. 4B is a schematic sectional view that depicts a protrusion 43 (connected to a holder, not shown), a receptacle 44 and a spring-loading element 45 that provides spring-loading to the holder.

Figure 5:
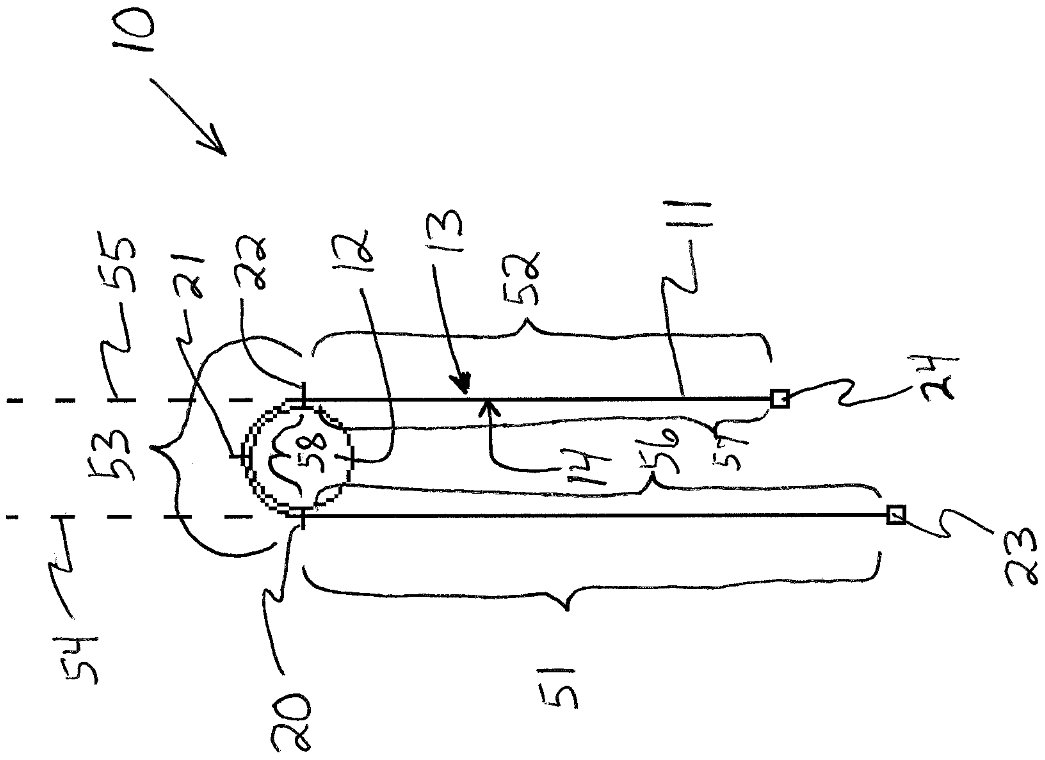

FIG. 5 is a schematic side view of the light absorbing and light emitting device 10 with the first structure 11 in an intermediate position.

Figure 6:
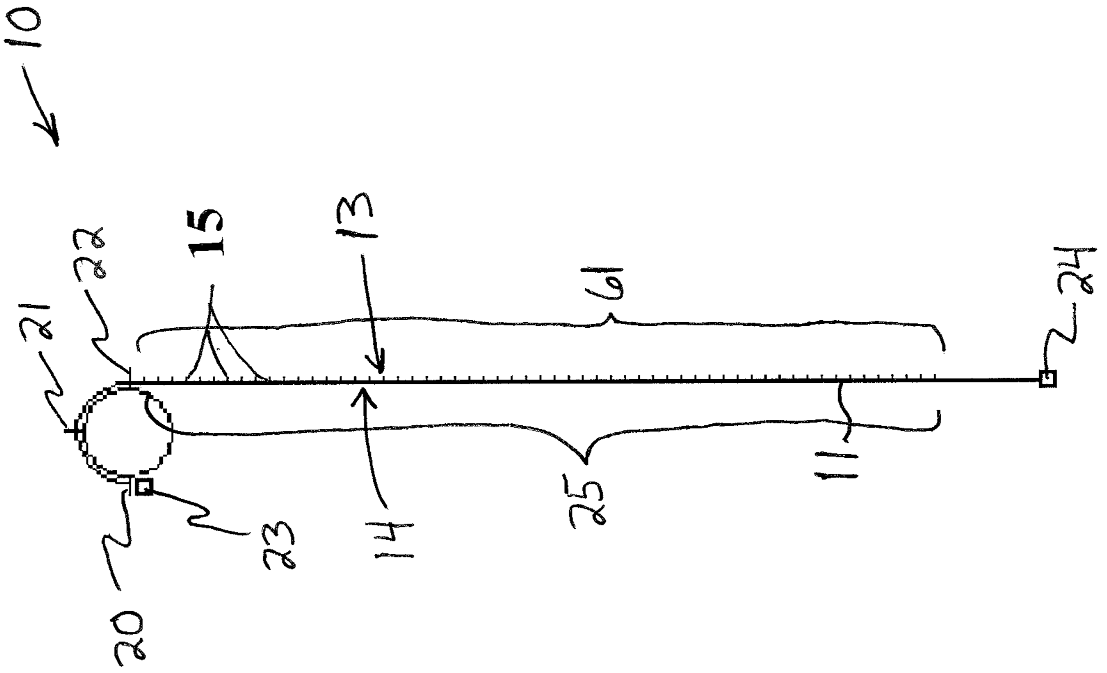

FIG. 6 is a schematic side view of the light absorbing and light emitting device 10 with the first structure 11 in the first position.

Figure 7:
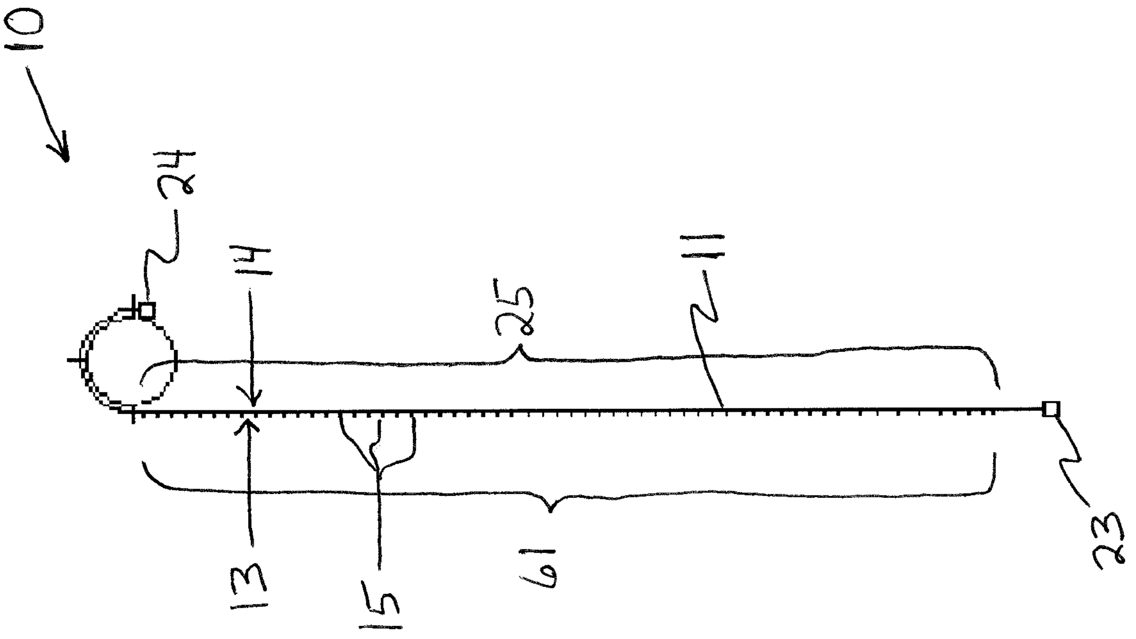

FIG. 7 is a schematic side view of the light absorbing and light emitting device 10 with the first structure 11 in the second position.

Figure 8:
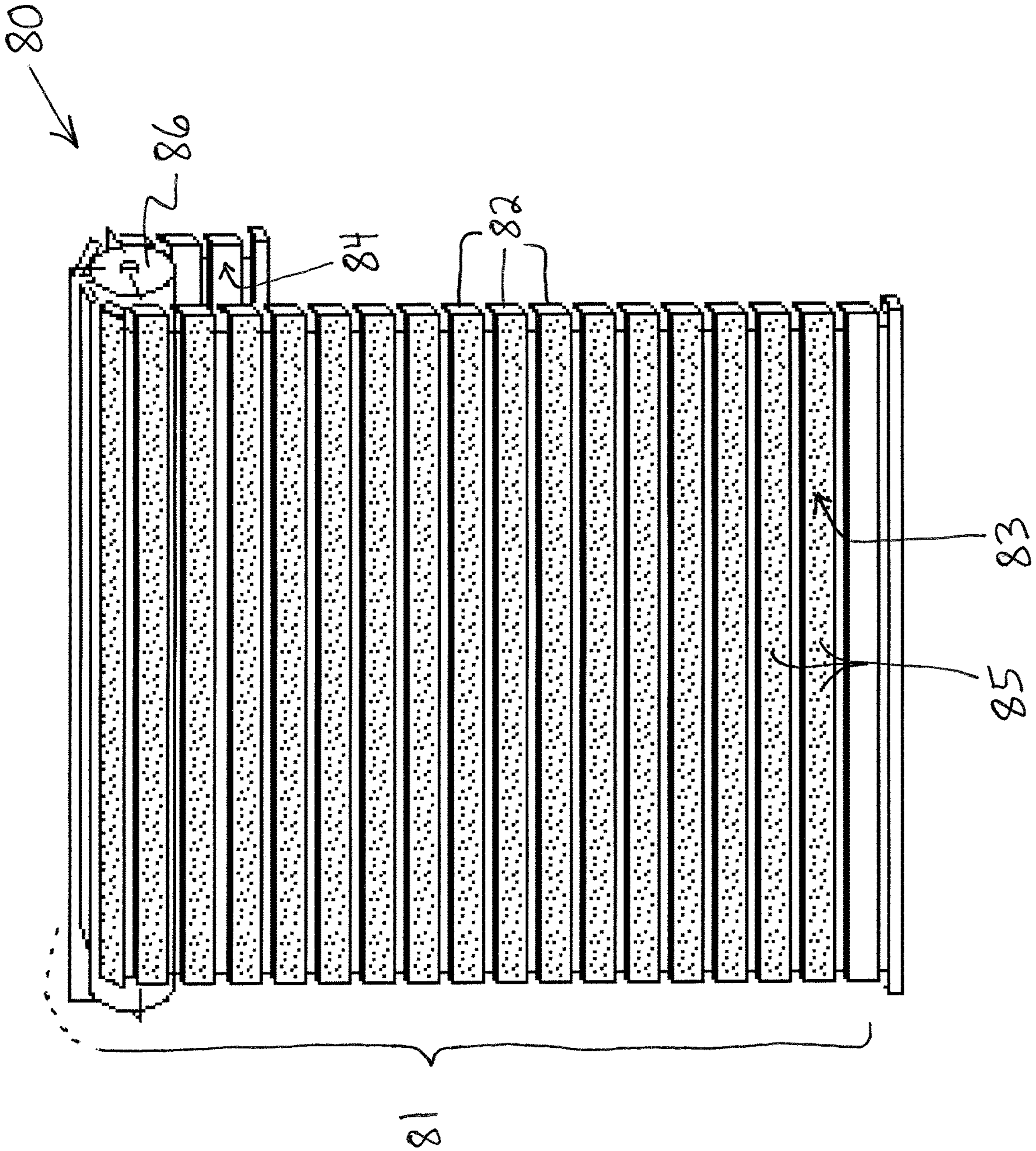

FIG. 8 is a schematic perspective view of a light absorbing and light emitting device 80 comprising a first structure 81 that comprises a plurality of first structure sub-elements 82 that are flexibly connected to each other.

Figure 9:
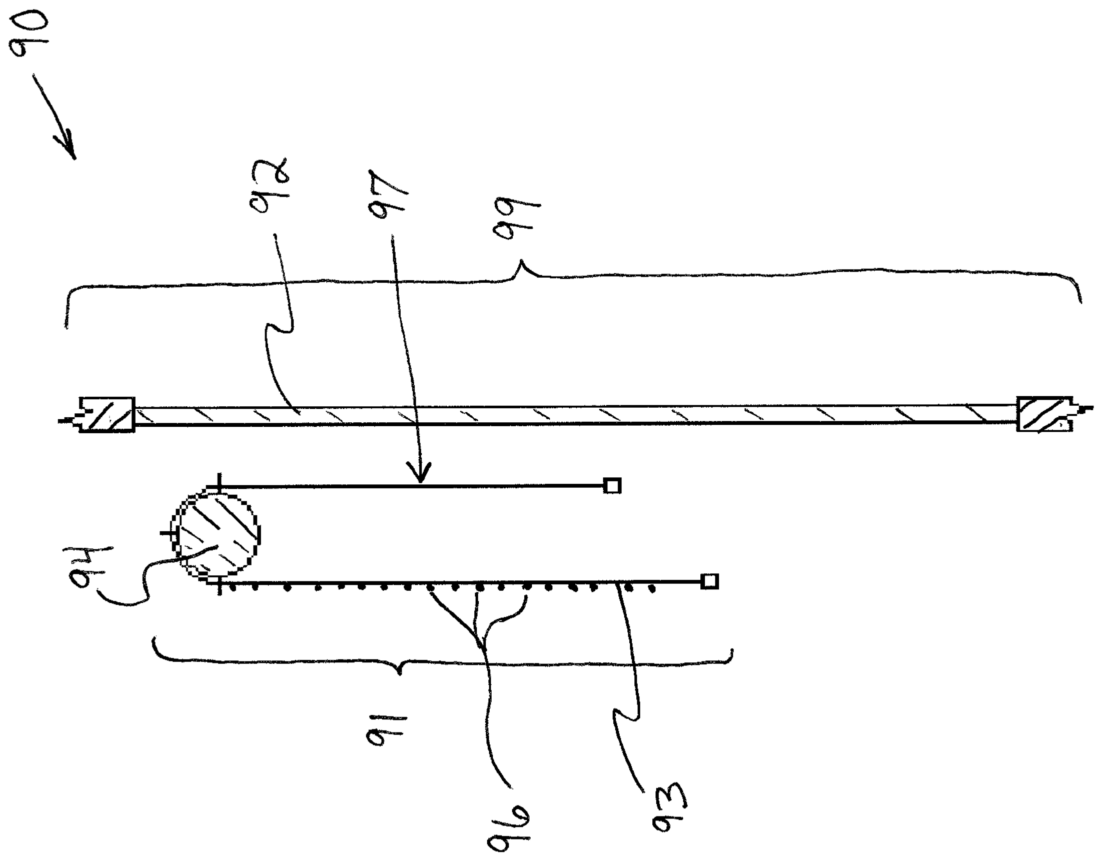

FIG. 9 is a schematic perspective view of a light admitting, light absorbing and light emitting assembly 90.

Figure 10:
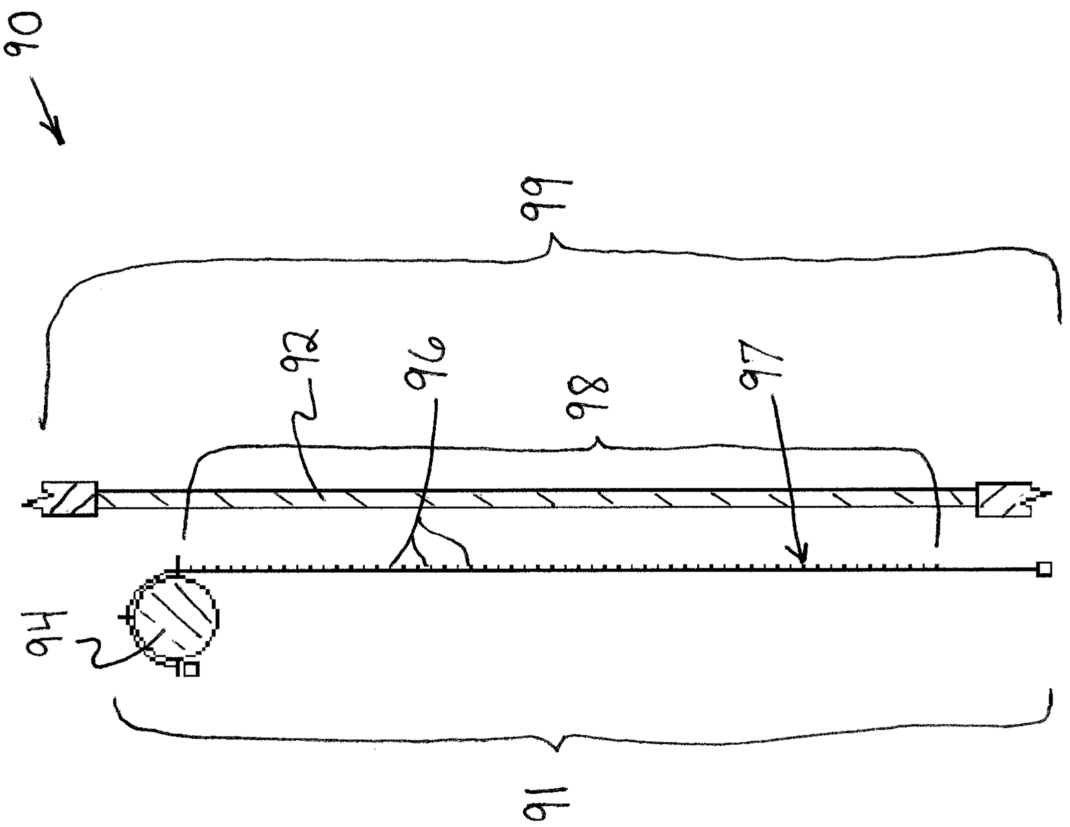

FIG. 10 is a schematic perspective view of the light admitting, light absorbing and light emitting assembly 90 depicted in FIG. 9, with the first structure 93 in a first structure first position.

Figure 11:
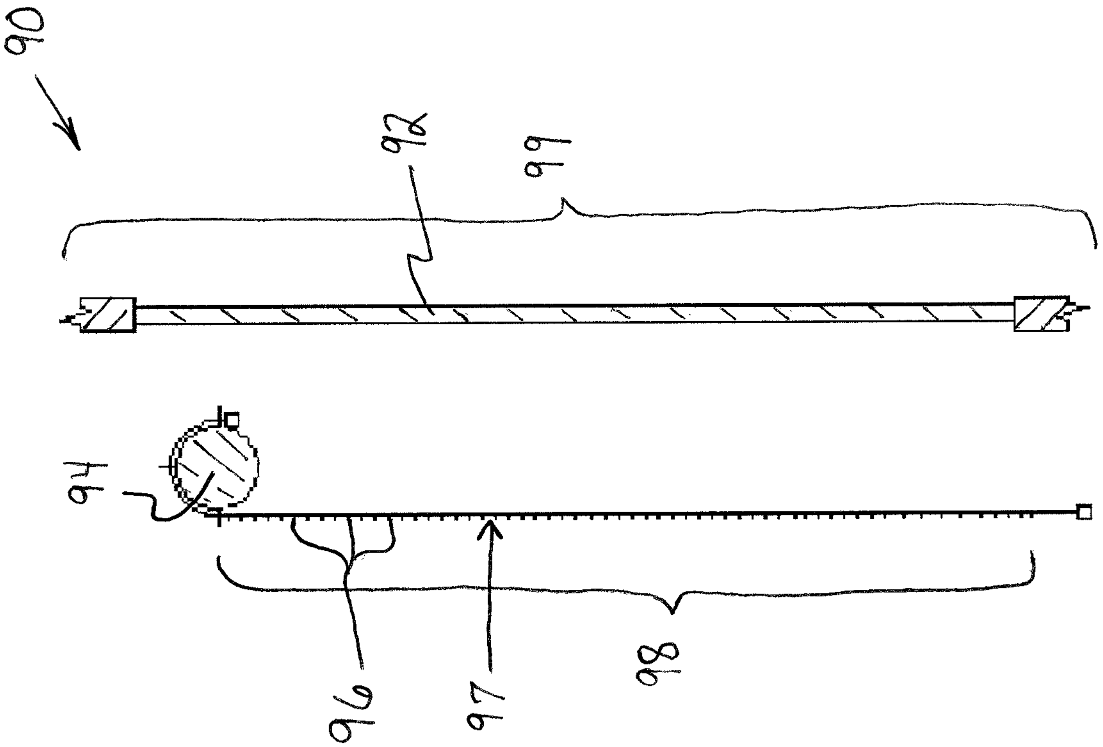

FIG. 11 is a schematic perspective view of the light admitting, light absorbing and light emitting assembly 90 depicted in FIG. 9, with the first structure 93 in a first structure second position.

Figure 12:
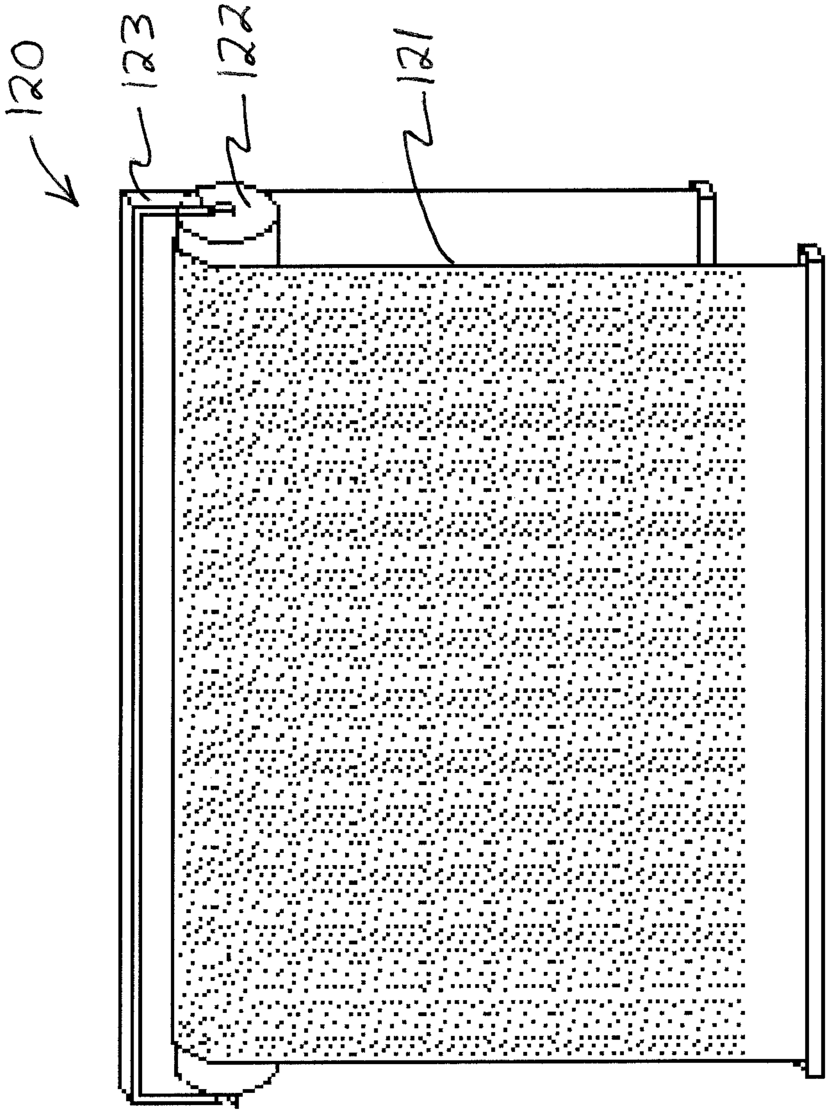

FIG. 12 depicts an arrangement 120 that comprises a first structure 121, a holder 122 and a bracket 123, in which the bracket 123 and the holder 122 define a closed loop through which the first structure 121 extends.

Figure 13:
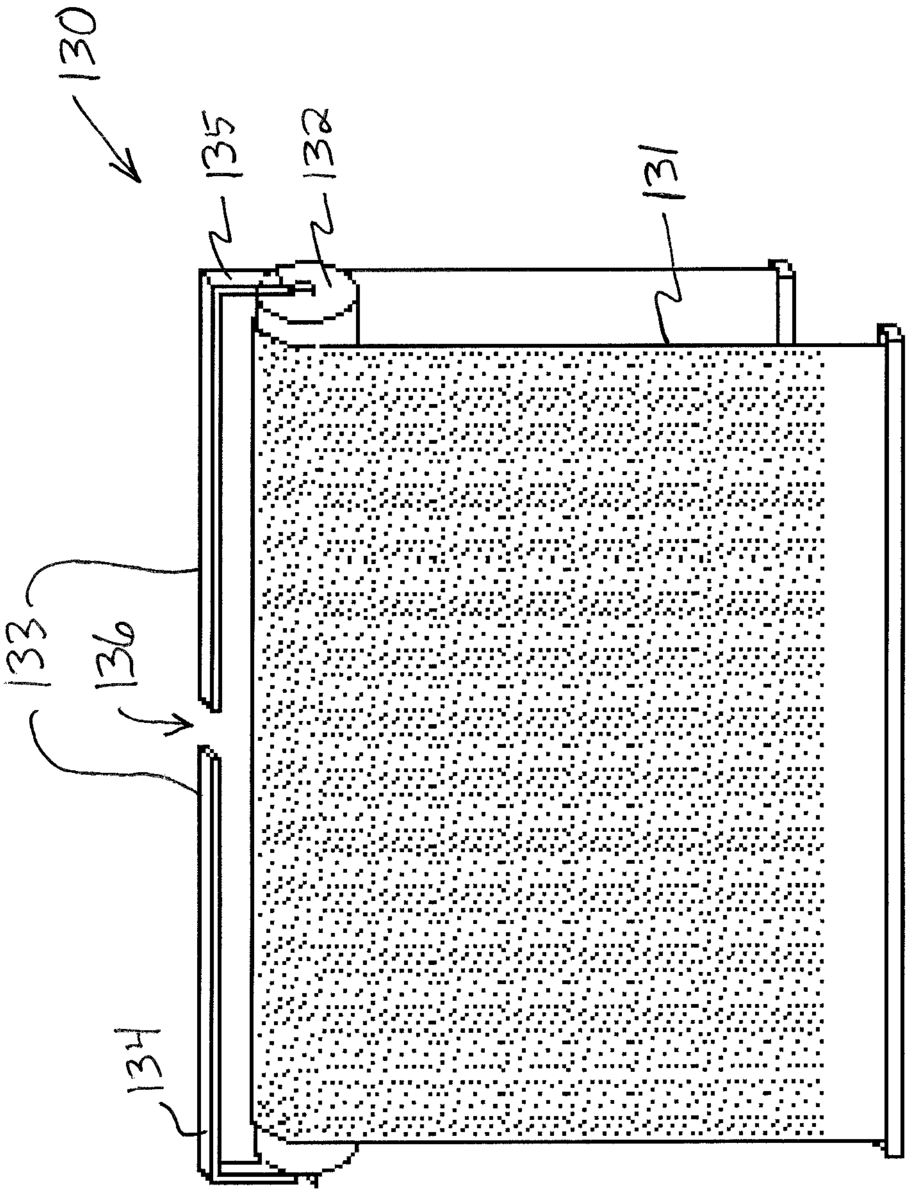

FIG. 13 depicts an arrangement 130 that comprises a first structure 131, a holder 132 and a bracket 133, in which the bracket 133 and the holder 132 do not define a closed loop, and the geometries of the first structure 131, the holder 132 and the bracket 133 (comprising a first clip structure 134 and a second clip structure 135) are such that the first structure 131 is retained in the space that respective portions of the bracket 133 and the holder 132 partially surround.

Figure 14:
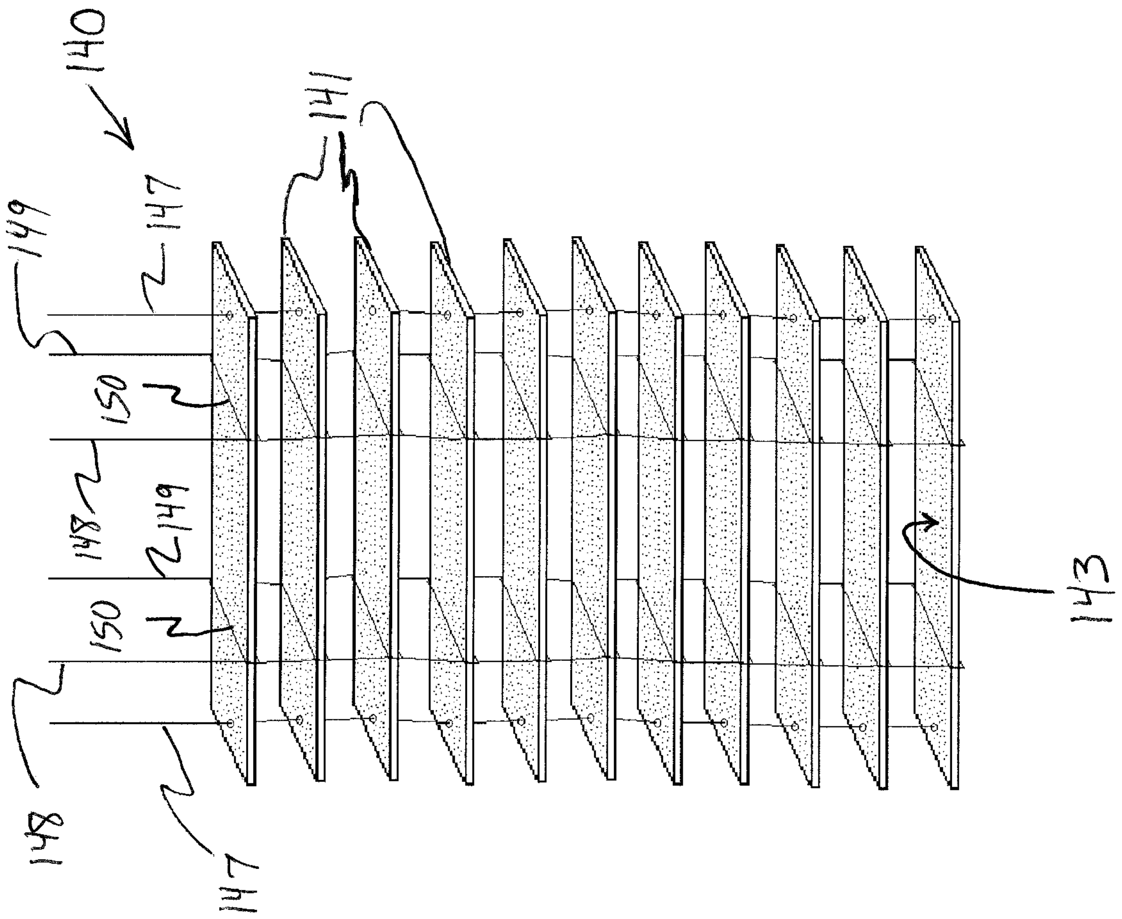

FIG. 14 is a schematic perspective view of a light absorbing and light emitting device 140 with each of a plurality of first structures 141 in a respective intermediate position between its respective first structure first position and its respective first structure second position.

Figure 15:
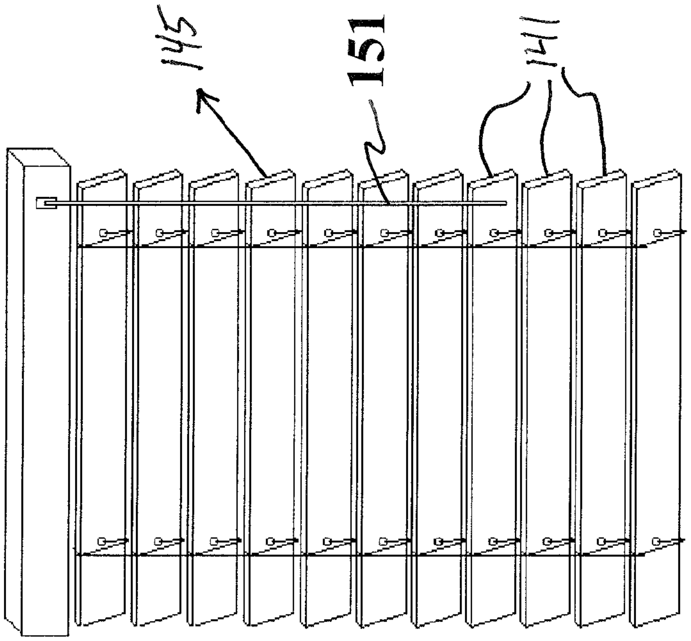

FIG. 15 is a schematic perspective view of the light absorbing and light emitting device 140 depicted in FIG. 14, with each of the first structures 141 in a respective first structure first position.

Figure 16:
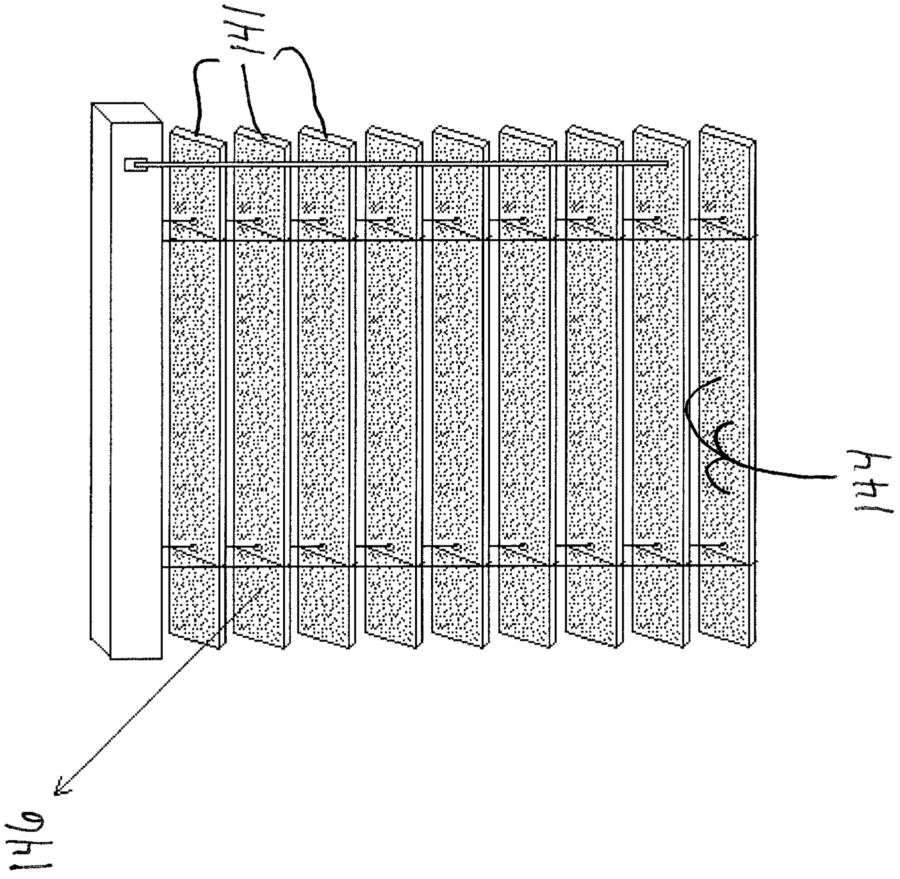

FIG. 16 is a schematic perspective view of the light absorbing and light emitting device 140 depicted in FIG. 14, with each of the first structures 141 in a respective first structure second position.

Figure 17:
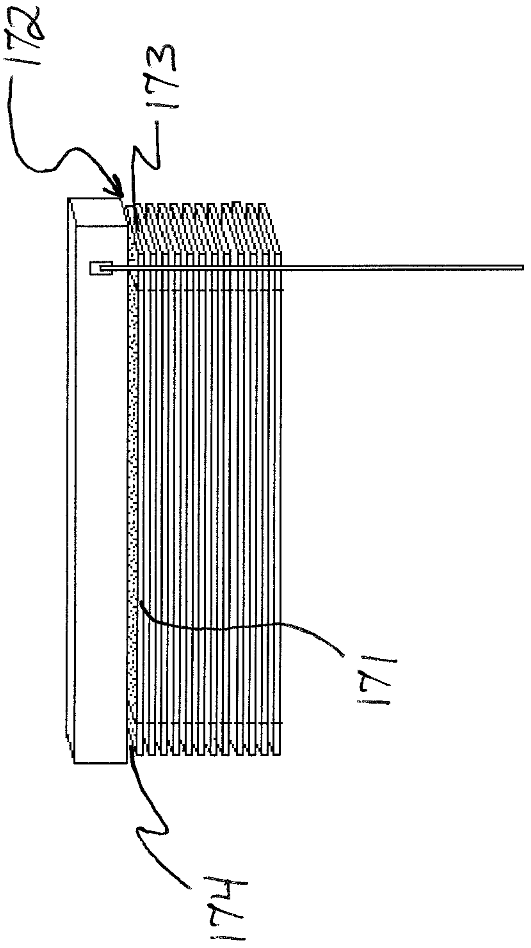

FIG. 17 is a schematic perspective view of the light absorbing and light emitting device 140 depicted in FIG. 14, with the first structures 141 in a stacked arrangement.

DETAILED DESCRIPTION OF THE INVENTIVE SUBJECT MATTER

The terms “first”, “second”, etc. may be used herein to describe various elements, e.g., structures, portions of structures, sides of structures, positions of structures, directions, edges of structures, brackets, structure-retaining regions, stops, axes, strands, support regions, distances, etc. Such numbering is only used to distinguish one such element from another. Thus, for example, a first edge of a structure could be termed a second edge of such structure without departing from the teachings of the present inventive subject matter.

Relative terms, such as “up”, “down”, “tilt”, etc. may be used herein to describe one element’s relationship to another element (or to other elements), e.g., as illustrated in the Figures Such relative terms are intended to encompass different orientations of the device in addition to the orientation depicted in the Figures and/or as described herein. For example, if a device is turned over, elements described as being on the “lower” side of other elements would then be oriented on “upper” sides of the other elements. The exemplary term “up” can therefore encompass “up”, “down”, “sideways”, “diagonally”, etc., depending on the particular orientation.

The expression “flexible and sheet-like” (or “flexible, sheet-like”), as used herein, means that the structure (or a region of a structure) that is referred to as being a “flexible and sheet-like structure” has the following characteristics:

[1] the structure (or region of a structure) is capable of being laid substantially flat on a substantially flat surface, with a first side of the structure (or region of the structure) facing the substantially flat surface and a second side of the structure (or region of the structure) facing away from the first side, and a smallest distance between a location on the first side and a location on the second side (or an average of the respective distances between one hundred locations substantially evenly spaced over the first side, and their respective closest locations on the second side) is not greater than 1/50 of the largest dimension of the first side (and in some cases, not greater than 1/100, 1/200, 1/300, 1/400, 1/500, 1/750, 1/1000, 1/1500, 1/2000, 1/3000, 1/4000, 1/5000, 1/7500, 1/10,000, 1/20,000 or less of the largest dimension of the first side); and

[2] the structure (or region of a structure) can be curved or bent around a support element (e.g., a holder), e.g., the structure (or region of a structure) could be curved around a cylindrical holder.

The expressions "first side" and/or "second side", as used herein, when used in connection with a first structure (or a region of a first structure), whether or not the first structure is flexible and whether or not it is sheet-like, is/are used in the same context as those expressions are used in the definition of "flexible and sheet-like" as set forth above. Accordingly, even where a first structure (or a region of a first structure) is not laid flat (e.g., it is curved around a cylindrical holder, or bent around a holder that has a polygonal cross-section), the first structure can have a first side and a second side. For example, a flexible and sheet-like structure can be curved 180 degrees around a cylindrical holder, and can have [1] a first side (facing away from the cylindrical holder) that has a first side-first substantially flat region, a first side-second substantially flat region and a first side-180 degree curved region, and [2] a second side (facing toward and in contact with the cylindrical holder) that has a second side-first substantially flat region, a second side-second substantially flat region and a second side-180 degree curved region, with the second side having substantially the same shape as the first side.

A structure (or a region of a structure) that is "flexible and sheet-like" can optionally also have the following additional characteristic:

if the structure (or region of the structure) is laid substantially flat, the first side is substantially uniformly spaced from the second side (i.e., for each location on a planar surface defined by the first side, a closest location on a planar surface defined by the second side is spaced from such location on the planar surface defined by the first side by a first side-second side minimum distance, and the respective first side-second side minimum distances corresponding to each location on the planar surface defined by the first side are substantially uniform), i.e., such that if the structure or region of a structure is laid substantially flat on a substantially flat surface, a planar surface defined by the first side is substantially parallel to a planar surface defined by the second side (e.g., the structure is of substantially uniform thickness).

When a first element is referred to herein as being "on" a second element (e.g., in the expression "the at least one phosphorescent material and/or at least one phase change material is on the first side"), the first element can be directly on the second element (i.e., in direct contact with the second element), or intervening elements may be present (e.g., the first element can be directly on a third element, which in turn is directly on the second element). In contrast, when an element is referred to herein as being "directly on" another element, there are no intervening elements present. In addition, a statement that a first element is "on" a second element is synonymous with a statement that the second element is "on" the first element.

When a first element is referred to herein as being "attached" to a second element (e.g., in the expression "the first stop is attached to the first structure"), the first element can be directly attached to the second element, or intervening elements may be present (e.g., the first element can be directly attached to a third element, which in turn is directly attached to the second element). In contrast, when an element is referred to herein as being "directly attached" to another element, there are no intervening elements present. In addition, a statement that a first element is "attached to" a second element is synonymous with a statement that the second element is "attached to" the first element.

The expression "planar surface defined by the first side" and analogous expressions (e.g., "surface defined by the second side"), as used herein, refer to a planar region that would be occupied by a first planar surface of a structure if the structure were positioned with the first planar surface of the structure facing the first side and in contact with at least three points on the first side. Accordingly, even where, on a micro scale, a structure is not substantially planar (e.g., the structure is a woven material, a porous material and/or an engineered non-woven material), the structure can be referred to as defining at least a first side (and/or as defining a first planar surface), and a flexible and sheet-like structure can be referred to as defining a first side and a second side (and/or as defining a first planar surface and a second planar surface).

The expression "substantially uniform", as used herein (e.g., in the expression "the respective first side-second side minimum distances corresponding to each location on the surface defined by the first side are substantially uniform") means that at least 90 percent of the respective values (e.g., first side-second side minimum distances) is between 0.9 and 1.1 times a particular value.

The "largest dimension" of a thing (e.g., of a first side), as used herein, is the distance (in any direction) between any two locations on the thing that is as large or larger than the distance between any other pair of locations on the thing.

The expression "supported by", as used herein to indicate that a first structure is "supported by" a second structure (e.g., in the expression "the light absorbing/light emitting structure supported by the holder") means that the second structure [1] prevents or inhibits the first structure from changing its position translationally due to gravitational force, [2] prevents or inhibits the first structure from changing its orientation due to gravitational force, and/or [3] prevents or inhibits the first structure from changing its shape due to gravitational force. The expression "prevents or inhibits", as used above in this paragraph, means that the expression "supported by" encompasses an arrangement in which gravitational force can cause some translational change of position, some change in orientation and/or some change in shape, and the second structure reduces the extent of such change(s). The expression "prevents", as used above in this paragraph, means that the expression "supported by" encompasses an arrangement in which gravitational force can cause some translational change of position, some change in orientation and/or some change in shape, but no location of the first structure moves by a distance that is more than 1 percent of the largest dimension of the first structure due to gravitational force, and/or no location of the first structure moves by a distance of more than 1 mm.

The expression "substantially opposite", as used herein, e.g., in the expression "the first direction is substantially opposite to the second direction", means that in any plane that encompasses the first direction and the second direction, there exists an angle between the first direction and the second direction that is at least 135 degrees (and in some cases, as least 150 degrees, at least 160 degrees, at least 170 degrees, or at least 175 degrees).

The expression "the first bracket and the holder define a region through which the first structure extends and is slidably retained", as used herein, means that respective portions of the first bracket and the holder surround, at least partially, a space through which the first structure extends, and that the first structure can move slidably such that as such sliding occurs, different portions of the first structure are within the space, but at all times during such sliding, some portion of the first structure is in the space.

For example, the holder can comprise a cylindrical surface (comprising a curved main surface and first and second circular end regions), the first bracket can comprise a main section and first and second radial connector sections, the main section extending parallel to an axis of the curved cylindrical surface from a plane defined by the first circular end region to a plane defined by the second circular end region, the first radial connector section extending (e.g., substantially perpendicularly) to the main section from the first end region to a first end of the main section, and the second radial connector section extending (e.g., substantially perpendicularly) to the main section from the second end region to a second end of the main section. In such an arrangement, the holder and the first bracket define a space and extend entirely around the first structure, which can slide relative to the space. In some embodiments that have such an arrangement and in which the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, and the first edge is substantially perpendicular to the third edge, the first structure can be oriented such that the first edge and the second edge are substantially parallel to the main section, and the first structure is slidable within the space such that each of the first edge and the second edge are movable while remaining substantially parallel to the main section (in some of such embodiments, for example, the first edge has a first edge first end and a first edge second end, the second edge has a second edge first end and a second edge second end, the first edge first end is movable (back and forth) along a path extending from adjacent to the first end of the main section, 90 degrees in a first direction (clockwise or counter-clockwise) along the perimeter of the first circular end region and then down, the first edge second end is movable (back and forth) along a path extending from adjacent to the second end of the main section, 90 degrees in the first direction along the perimeter of the second circular end region and then down, the second edge first end is movable (back and forth) along a path extending from adjacent to the first end of the main section, 90 degrees in a second direction (the other of clockwise or counter-clockwise) along the perimeter of the first circular end region and then down, the second edge second end is movable (back and forth) along a path extending from adjacent to the second end of the main section, 90 degrees in the second direction along the perimeter of the second circular end region and then down, with all such movement of the first edge and the second edge (and the first structure extending from the first edge to the second edge) being simultaneous, such that [1] when the first edge moves such that the first edge first end and the first edge second end move down, the second edge moves such that the second edge first end and the second edge second end move up or move circumferentially along the cylindrical holder toward the first bracket, [2] when the second edge moves such that the second edge first end and the second edge second end move down, the first edge moves such that the first edge first end and the first edge second end move up or move circumferentially along the cylindrical holder toward the first bracket, [3] when the first edge moves circumferentially along the cylindrical holder away from the first bracket, the second edge moves such that the second edge first end and the second edge second end move up, and [4] when the second edge moves circumferentially along the cylindrical holder away from the first bracket, the first edge moves such that the first edge first end and the first edge second end move up; in other words, the first structure is threaded through the space, and the first structure is free to move back and forth relative to the space, with the respective first ends of the first and second edges remaining substantially in a first plane perpendicular to the holder cylindrical axis, and the respective second ends of the first and second edges remaining substantially in a second plane perpendicular to the holder cylindrical axis.

The expression "the first bracket and the holder define a region through which the first structure extends and is slidably retained", as used herein, encompasses [1] arrangements in which the first bracket and the holder define a closed loop (the expression "closed loop", as used herein, means that at least one sequence of locations (such locations not necessarily all in a single plane) can be identified that together extends around the space, and in which every location in the sequence of locations is on the first bracket or on the holder), as well as [2] arrangements in which the first bracket and the holder do not define a closed loop (and yet the geometries are such that the first structure is retained in the space).

For example, a substantially flat structure having a width, a length and a thickness, can be held in a space defined by a curved region of a cylindrical surface and first and second clip structures, the first clip structure having a first clip structure first portion and a first clip structure second portion, the first clip structure first portion extending from a first circular end region of the cylindrical surface to a first clip structure first portion end location spaced from the axis of the cylinder by a distance that is slightly larger than the radius of the cylinder, the first clip structure second portion extending in a direction substantially parallel to the axis of the cylinder from the first clip structure first portion end location to a distal end of the first clip structure, the second clip structure having a second clip structure first portion and a second clip structure second portion, the second clip structure first portion extending from a second circular end region of the cylindrical surface to a second clip structure first portion end location spaced from the axis of the cylinder by a distance that is slightly larger than the radius of the cylinder, the second clip structure second portion extending in a direction substantially parallel to the axis of the cylinder from the second clip structure first portion end location to a distal end of the second clip structure, the distal end of the second clip structure spaced a small distance from the distal end of the first clip structure, by virtue of the width of the first structure being substantially larger than the distance between the distal end of the first clip structure and the distal end of the second clip structure.

The expression "first stop movement path", as used herein (e.g., in the expression "the first stop moves along a first stop movement path"), refers to a path in which a first stop (or any other stop) moves, e.g., as the first structure is moved. A similar expression, except that "first" is replaced by another numerical indicator (e.g., "second") analogously refers to a path in which a correspondingly numbered stop moves.

The expression "wrapped around the holder", as used herein (e.g., in the expression "at least 75 percent of the first structure is wrapped around the holder"), refers to a structure being wound circumferentially around another structure one or more windings (and/or fractions of windings)(e.g., as a dual-layer winding, i.e., where 360 degrees rotation of the holder can lead to two additional layers of thickness or two fewer layers of thickness, or as a single-layer winding, i.e., where 360 degrees rotation of the holder can lead to one additional layer of thickness or one fewer layer of thickness), e.g., so as to not block the view out a window, or to reduce or minimize the portion of a window that is blocked by a window shade.

When referring to a first portion of a structure being "substantially parallel" to a second portion of the structure (e.g., in the expression "the first edge is substantially parallel to the second edge"), the expression "substantially parallel" means that a line defined by the first portion of the structure does not diverge from a line defined by the second portion of the structure by more than 5 degrees.

When referring to a portion (or portions) of a first structure being "substantially parallel" to a portion (or portions) of a second structure (e.g., in the expression "the first edge and the second edge are substantially parallel to the holder cylindrical axis"), the expression "substantially parallel" means that lines defined by the portion (or portions) of the first structure does not (or do not) diverge from a line defined by the portion (or portions) of the second structure by more than 5 degrees.

When referring to planes being "substantially parallel" (e.g., in the expression "a planar surface defined by the first side of the first portion is substantially parallel to a planar surface defined by the second side of the first portion"), the expression "substantially parallel" means that lines defined by the intersections of any other plane with planes described as being "substantially parallel" do not diverge from each other by more than 5 degrees.

The expression "substantially perpendicular", as used herein to specify that a first portion of a structure is perpendicular to a second portion of the structure (e.g., in the expression "wherein the first edge is substantially perpendicular to the third edge"), means that an angle defined by (1) a line defined by the first portion of the structure, and (2) a line defined by the second portion of the structure is between 85 degrees and 95 degrees.

The expression "substantially cylindrical", as used herein (e.g., in the expression "the holder is substantially cylindrical"), and the expression "substantially in the shape of a cylinder", as used herein (e.g., in the expression "the holder is substantially in the shape of a cylinder") means that at least 95 percent of the points in the surface which is characterized as being substantially cylindrical (or substantially in the shape of a cylinder) are located on one of or between a pair of imaginary cylindrical structures which are spaced from each other by a distance of not more than 5 percent of their largest dimension.

The expression "adjacent", as used herein to refer to a spatial relationship between structures, means that the structures are next to each other, i.e., no other similar structure is between the structures. For instance, where respective first edges of two first structures are adjacent to each other, no other first structure (or edge of a first structure) is between them. For example, in FIG. 17, the first structures 141 are in a stacked arrangement in which each of the first structures 141 is adjacent to at least one other first structure 141 (i.e., the top first structure 141 is adjacent to the first structure 141 just below it, the bottom first structure 141 is adjacent to the first structure 141 just above it, and each of the other first structures 141 is adjacent to a first structure 141 just above it and a first structure 141 just below it).

As used herein, the expression "substantially no space" (e.g., in the expression "at least two of the plurality of first structures have substantially no space between them") means that at least a first location on a first of the two first structures is spaced from at least a first location on a second of the two first structures by not more than 3 mm (and in some cases not more than 2 mm, in some cases not more than 1 mm, in some cases not more than 0.5 mm, in some cases not more than 0.3 mm). For example, in FIG. 17, the first structures 141 are in a stacked arrangement in which there is substantially no space between each pair of adjacent first structures 141.

As used herein, the expression "close proximity" to refer to a spatial relationship between two structures (e.g., in the expression "at least two of the first structures are in close proximity") means that there is substantially no space between the two structures. For example, in FIG. 17, the first structures 141 are in a stacked arrangement in which each pair of adjacent first structures are in close proximity.

As used herein, the term "substantially," where used to modify another term means (unless specifically defined herein in a different way) at least about 95 percent correspondence with the feature recited.

The expression "connected" as used herein (e.g., in the expression "a first stop 23 is connected to the first edge 16") means that a first structure (which is described as being connected to a second structure) is directly connected to the second structure (i.e., the first structure is in direct contact with the second structure and substantially held in such contact), or that the first structure is indirectly connected to the second structure (i.e., there can be one or more intervening structures, and the first structure is directly connected to an intervening structure (or an intervening sequence of structures that are each directly connected with a next sequential intervening structure) that is directly connected with the second structure. In some aspects, movement of a second structure (to which a first structure is described as being connected) results in substantially corresponding movement of the first structure.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure.

The present inventive subject matter encompasses many combinations of elements and features. The expression "In some embodiments in accordance with the present inventive subject matter, which can include or not include, as suitable, any of the other features described herein," or the like, is used in the present specification to introduce elements and/or features of the present inventive subject matter that can be included or not included in any particular embodiment, i.e., elements and/or features that can be combined in any suitable way. In other words, the present inventive subject matter encompasses all combinations of elements and/or features that are introduced with the expression "In some embodiments in accordance with the present inventive subject matter, which can include or not include, as suitable, any of the other features described herein," or the like.

As noted above, the present inventive subject matter, encompasses devices that comprise:

a first structure; and a holder, the first structure is supported by the holder, at least one phosphorescent material and/or at least one phase change material is/are on at least a first side of at least a first portion of the first structure, the first structure is movable relative to the holder at least between a first structure first position and a first structure second position, in the first structure first position, the first side of the first portion faces a first direction, in the first structure second position, the first side of the first portion faces a second direction, and the first direction differs from the second direction.

In devices in accordance with the present inventive subject matter, the first structure can comprise any suitable material or materials.

Figure 1:
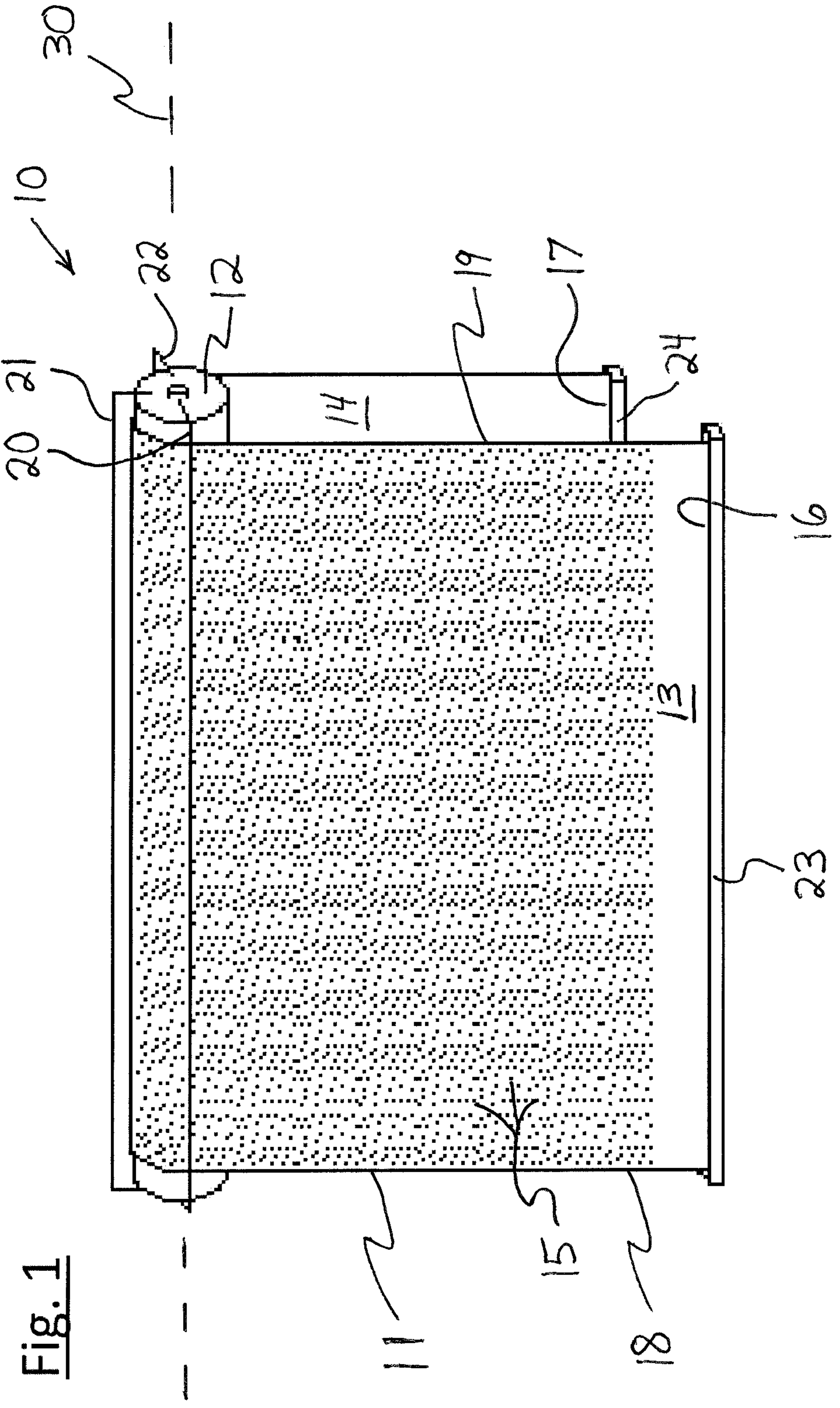
FIG. 1 is a schematic perspective view of a representative embodiment of a light absorbing and light emitting device 10 in accordance with the present inventive subject matter, with the first structure 11 in an intermediate position (between a first position depicted in FIG. 3) and a second position (depicted in FIG. 2).

In some embodiments in accordance with the present inventive subject matter which can include or not include, as suitable, any of the other features described herein, the first structure can comprise a flexible and sheet-like structure. As noted above, the expression "flexible and sheet-like" (or "flexible, sheet-like"), as used herein, means that the structure (or a region of a structure) is capable of being laid substantially flat on a substantially flat surface, with a first side of the structure (or region of a structure) facing the substantially flat surface and a second side of the structure (or region of a structure) facing away from the first side, and a smallest distance between a location on the first side and a location on the second side (or an average of the respective distances between one hundred locations substantially evenly spaced over the first side, and their respective closest locations on the second side) is not greater than 1/50 of the largest dimension of the first side (and in some cases, not greater than respective smaller ratios), and the structure (or region of a structure) can be curved or bent around a support element (e.g., a holder). In the embodiment depicted in FIGS. 1-7 (discussed below), for example, the structure 11 is flexible and sheet-like because [1] it can be curved around the holder 12 (as shown in FIG. 1), [2] it is capable of being laid substantially flat on a substantially flat surface, with the first side 13 facing the substantially flat surface and the second side 14 facing away from the first side 13, and [3] its thickness (minimum distance between the first side 13 and the second side 14 is less than 1/50 of the largest dimension of the first side 13.

In some embodiments in accordance with the present inventive subject matter which can include or not include, as suitable, any of the other features described herein, only a portion of the first structure can be flexible and sheet-like, or an entirety of the first structure can be flexible and sheet-like.

In some embodiments in accordance with the present inventive subject matter which can include or not include, as suitable, any of the other features described herein, the first structure can comprise a structure that is not flexible and sheet-like, but is capable of being curved around a holder, and is capable of being laid substantially flat on a substantially flat surface, with a first side facing the substantially flat surface and the second side facing away from the first side. In the embodiment depicted in FIG. 8, the first structure 81 comprises a plurality of first structure sub-elements 82 that are flexibly connected to each other, each sub-element 82 comprising a first side 83 and a second side 84, with a phosphorescent material and/or a phase change material 85 on the first side 83.

In some embodiments in accordance with the present inventive subject matter which can include or not include, as suitable, any of the other features described herein, only a portion of the first structure can be not flexible, or an entirety of the first structure can be not flexible.

In some embodiments in accordance with the present inventive subject matter which can include or not include, as suitable, any of the other features described herein, only a portion of the first structure can be not sheet-like, or an entirety of the first structure can be not sheet-like.

Persons of skill in the art are familiar with a wide range of materials, compositions and combinations of materials that can be used to make suitable first structures (e.g., cloth, plastic, metal, wood, etc.), and any of such materials, compositions and combinations of materials are encompassed in the present inventive subject matter.

The present inventive subject matter encompasses devices in which the first structure has any degree of opacity, e.g., the first structure can be substantially opaque or completely opaque, it can be substantially transparent or completely transparent, or it can have any degree of opacity between completely opaque and completely transparent. In some embodiments in accordance with the present inventive subject matter, which can include or not include, as suitable, any of the other features described herein, at least part of the first structure (e.g., the first portion of the first structure) prevents at least some light from passing through the first portion of the first structure from its first side to its second side.

The first structure can provide any additional suitable property, e.g., it can be electrically insulating, heat insulating, etc.

In devices in accordance with the present inventive subject matter, the holder can comprise any suitable material or materials (e.g., metal, plastic, wood, etc.). The holder supports the first structure. In many instances, supporting the first structure means holding the first structure in place, e.g., resisting the force of gravity acting on the first structure (and/or other forces, e.g., breezes, etc.). For example, in the embodiment depicted in FIG. 9, the holder 94 supports (slidably) the first structure 93 relative to the first light-transmitting structure 92.

In devices in accordance with the present inventive subject matter, the at least one phosphorescent material and/or at least one phase change material can comprise any suitable material or materials. Persons of skill in the art are familiar with a wide variety of phosphorescent materials and a wide variety of phase change materials, and any of such materials, or combinations thereof, can be used in accordance with the present inventive subject matter.

The expression "phosphorescent material" (and "phosphorescent materials"), as used herein refers to materials that absorb electromagnetic radiation (e.g., visible light, near infrared light, etc.) and (as a result of such absorption) emit electromagnetic radiation (e.g., visible light, near infrared light, etc.) at a later time (i.e., not immediately, e.g., for some phosphorescent materials, up to several hours later). A theory as to how this occurs (in some instances) is that an electron in a phosphorescent material absorbs a photon and then undergoes an unusual inter-system crossing into an energy state of higher spin multiplicity, e.g., a triplet state. As a result, the only way for the electron to return to a lower energy singlet state is through a "forbidden" transition. Such a "forbidden" transition progresses comparatively slowly (e.g., especially in comparison to fluorescence, which occurs almost immediately, e.g., on the order of 10 nanoseconds). Most phosphorescent materials have triplet lifetimes on the order of milliseconds, but some phosphorescent materials have triplet lifetimes of up to minutes or even hours; such materials thus can store light energy. In materials in which the phosphorescent quantum yield is high, significant amounts of light can be stored and released over long periods of time (e.g., up to hours).

Some representative examples of phosphorescent materials include the following:

- zinc sulfide (ZnS), with a small amount (a few ppm) of one or more activators, e.g., silver (which makes bright blue light, having a dominant wavelength of about 450 nm), manganese (which makes orange-red light, having a dominant wavelength of about 590 nm), copper (which makes greenish light, with a long-time glow);
- strontium aluminate ($SrAl_2O_4$ and other possible atomic ratios), activated with a suitable dopant, e.g., europium (e.g., $SrAl_2O_4$:Eu), and optionally also dysprosium;
- organic light-emitting diodes (OLEDs);
- calcium sulfide; and
- alkaline earth metal silicates.

As indicated above, the expression "phosphorescent material" (or "phosphorescent materials") as used herein, also encompasses phosphorescent materials that absorb and/or emit near infrared (NIR) electromagnetic radiation. Representative examples of such materials include NIR phosphorescent transition-metal complexes including Cu(I), Cu(II), Cr(III), Re(I), Re(III), Ru(II), Os(II), Ir(III), Pt(II), Pd(II), Au(I), and Au(III) complexes.

Persons of skill in the art are familiar with phase change materials (PCMs). A phase change material (PCM) is a substance with a high heat of fusion which, melting and solidifying at a certain temperature, is capable of storing and releasing large amounts of energy. Heat is absorbed when the material changes from solid to liquid, and heat is released when the material changes from liquid to solid.

When a PCM reaches the temperature at which it changes phase from solid to liquid (its melting temperature), it absorbs large amounts of heat at an almost constant temperature. The PCM continues to absorb heat without a significant rise in temperature until all the material is transformed to the liquid phase. When the ambient temperature around the PCM falls, the PCM solidifies, releasing its stored latent heat.

Persons of skill in the art are familiar with many different PCMs (suitable for use in a respective variety of temperature ranges), and any suitable PCM can be used. Various types of PCMs are known, e.g., organic materials, inorganic materials, inorganic eutectic materials, hygroscopic materials, and solid-solid materials. A phase change material can be provided in a working fluid that comprises a phase change material (in every instance herein where something comprises a phase change material, the phase change material, or at least a portion of it, can be in a working fluid that comprises a phase change material).

In devices in accordance with the present inventive subject matter, at least one phosphorescent material and/or at least one phase change material is/are on at least a first side of at least a first portion of the first structure (the expression "at least a first portion of the first structure" can refer to a part of the first structure, plural parts of the first structure or the entirety of the first structure, i.e., any portion(s) or all of it). As noted above, the expression "first side", when used in connection with a first structure (or region of a first structure), is used in the same context as it is used in the definition of "flexible and sheet-like" as set forth above. Accordingly, even where a first structure (or region of a first structure) is not laid flat (e.g., it is curved and/or bent around a holder), the first structure has a first side. For example, in the embodiment depicted in FIGS. 1-7, as shown in FIG. 5, the first structure 11 is curved 180 degrees around a cylindrical holder 12, and has a first side 13 (facing away from the cylindrical holder 12) that has (with the first structure in the position depicted in FIG. 5) a first side-first substantially flat region 51 (to the left of a plane 54 which is tangential to the left-most portion of the holder 12, a first side-second substantially flat region 52 (to the right of a plane 55 which is tangential to the right-most portion of the holder 12) and a first side-180 degree curved region 53 (between the plane 54 and the plane 55).

As indicated above, various aspects of the present inventive subject matter relate to light absorbing and light emitting devices; light admitting, light absorbing and light emitting assemblies; and methods that involve such devices, in which at least a first portion of a first structure comprises at least one phosphorescent material and/or at least one phase change material. In any aspects in accordance with the present inventive subject matter, and any embodiments in accordance with the present inventive subject matter, the at least one phosphorescent material and/or at least one phase change material can be in or on any region of the first structure, e.g., on the first side of the first portion of the first structure, in the first structure (e.g., in indentations on the first structure, embedded into the depth of the first structure (e.g., the first structure can be at least partially translucent or transparent)), or in any other arrangement or combination of arrangements, so long as the electromagnetic radiation (e.g., visible light, near infrared radiation, far infrared radiation) or other form of energy that the at least one phosphorescent material and/or at least one phase change material is intended to absorb (i.e., at least a portion thereof) can reach the at least one phosphorescent material and/or at least one phase change material.

The at least one phosphorescent material and/or at least one phase change material can be applied to or otherwise fixed to the first structure in any suitable way, a wide variety of which are well known to persons of skill in the art. For example, phosphorescent material and/or phase change material can be painted onto a first structure, can be in or on tape that is adhered to a first structure, can be sprayed on a first structure, can be spread on a first structure, etc., or any combination of applications. The at least one phosphorescent material and/or at least one phase change material can be present in any suitable amount, in any suitable concentration and/or in any suitable thickness, and the at least one phosphorescent material and/or at least one phase change material can have any suitable particle size characteristics (e.g., mean particle size, range of particle sizes, etc.).

In some embodiments, one or more phosphorescent powder(s) and/or one or more phase change materials can be alone, or can be mixed in any suitable material or materials (which may be clear, transparent, substantially transparent, translucent and/or substantially translucent), e.g., resin, epoxy, acrylic, silicone, paint, plastic, glass, ink, nail polish, clay, rubber, cement, glue, powder coating, spray paint, road paint, etc, in any suitable mix ratio. As representative examples, phosphorescent material(s) can be mixed in a ratio of 15 to 33 weight percent phosphorescent powder(s) and the remainder (67 to 85 weight percent) resin, e.g., 1 part phosphorescent powder to 4 parts resin (in some cases, loading a phosphorescent material/resin mixture with more than 33 weight percent of phosphorescent powder does not significantly increase brightness of emission).

There are applications and/or phosphorescent materials in which different ranges of particle sizes are desirable. In some embodiments, at least 50 weight percent (and in some embodiments, at least 75 weight percent, and in some embodiments, at least 90 weight percent) of the phosphorescent powder particles have diameters in the range of from 10 nanometers to 500 microns. In some embodiments, at least 50 weight percent (and in some embodiments, at least 75 weight percent, and in some embodiments, at least 90 weight percent) of the phosphorescent powder particles have diameters in the range of from 30 nanometers to 50 microns. In some embodiments, at least 50 weight percent (and in some embodiments, at least 75 weight percent, and in some embodiments, at least 90 weight percent) of the phosphorescent powder particles have diameters in the range of from 15 to 500 microns. In some embodiments, at least 50 weight percent (and in some embodiments, at least 75 weight percent, and in some embodiments, at least 90 weight percent) of the phosphorescent powder particles have diameters in the range of from 50 to 100 microns. In some embodiments, at least 50 weight percent (and in some embodiments, at least 75 weight percent, and in some embodiments, at least 90 weight percent) of the phosphorescent powder particles have diameters in the range of from 20 to 50 nanometers (in some cases, small particle sizes such as 20 to 50 nanometers, or even smaller, allow for maximizing the number of photon traps that are available, which can in some instances provide enhanced intensity and/or duration of light emission).

In some representative examples, phosphorescent material of large particle size (among the ranges set forth above) is desirable, to reduce the extent to which phosphorescent material particles block light emitted by other phosphorescent material particles.

In some representative examples where phosphorescent material is spray-painted onto a first structure, at least 50 weight percent (and in some embodiments, at least 75 weight percent, and in some embodiments, at least 90 weight percent) of the phosphorescent powder particles have diameters near 50 microns, e.g., in the range of from 40 to 60 microns.

In some representative examples where phosphorescent material is provided in a mixture with another material (e.g., resin, epoxy, acrylic, silicone, paint, plastic, glass, ink, nail polish, clay, rubber, cement, glue, powder coating, spray paint, road paint, etc,), the mixture is coated on a first structure to any desired thickness, e.g., 50 to 100 microns, 100 to 200 microns, 200 to 400 microns, 400 to 600 microns, 600 microns to 1 mm, 1 mm to 2 mm, or 2 mm to 3 mm.

In some representative examples, coating phosphorescent material to a thickness that is larger than the size of the largest particles of phosphorescent material is not advantageous, because with larger thickness, some phosphorescent particles might block light emitted by other phosphorescent particles.

In some representative examples, phosphorescent materials can be used that provide better results if the phosphorescent material particles are close to each other (e.g., to give off quanta).

In some representative examples in which phase change material is provided, thick coatings (e.g., 50 microns to 5 mm) can be desirable, due to lower cost of some phase change materials and to provide greater capacity for heat storage.

The at least one phosphorescent material and/or at least one phase change material can, if desired, be provided in any suitable combinations, e.g., to provide light emission of any desired color point or range of color points (e.g., so that the emission is white, near-white, etc., and/or of any suitable color temperature or correlated color temperature).

The at least one phosphorescent material and/or at least one phase change material can, if desired, be provided in any suitable pattern, e.g., different phosphorescent materials and/or eutectic materials (and/or different relative amounts thereof) can be employed at different regions of the first structure, so that emission from the first structure is in a desired pattern (e.g., different phosphorescent materials can be provided on the first structure such that, when emitting, the phosphorescent materials emit light of different color points in different regions, such that the light of respective different color points in different regions produces a desired pattern and/or a desired image (e.g., a replication of a painting, etc.).

In some embodiments in accordance with the present inventive subject matter which can include or not include, as suitable, any of the other features described herein, the first structure has a first side and a second side. As noted above, the expressions “first side” and “second side”, when used in connection with a first structure (whether or not it is flexible and sheet-like), are used in the same context as those expressions are used in the definition of “flexible and sheet-like” as set forth above. Accordingly, even where first structure (or region of a first structure) is not laid flat (e.g., it is curved and/or bent around a holder), the first structure has a first side and a second side. For example, in the embodiment depicted in FIGS. 1-7, as shown in FIG. 5, the first structure 11 is curved 180 degrees around a cylindrical holder 12, and has [1] a first side 13 (facing away from the cylindrical holder 12) that has (with the first structure in the position depicted in FIG. 5) a first side-first substantially flat region 51 (to the left of a plane 54 which is tangential to the left-most portion of the holder 12, a first side-second substantially flat region 52 (to the right of a plane 55 which is tangential to the right-most portion of the holder 12) and a first side-180 degree curved region 53 (between the plane 54 and the plane 55), and [2] a second side 14 (facing toward and in contact with the cylindrical holder 12) that has a second side-first substantially flat region 56 (to the right of the plane 54), a second side-second substantially flat region 57 (to the left of the plane 55) and a second side-180 degree curved region 58 (between the plane 54 and the plane 55), with the second side 14 having substantially the same shape as the first side 13.

The expression “at least a first side of at least a first portion of the first structure” (e.g., in the expression “at least one phosphorescent material and/or at least one phase change material is/are on at least a first side of at least a first portion of the first structure”) means that phosphorescent material and/or phase change material is on at least a portion of a first side of a first structure (e.g., as discussed in the preceding paragraph, such as the first side 13 of the first structure 11 in the specific embodiment depicted in FIGS. 1-7), i.e., the expression can refer to the entire first side of a first structure, or only part of such first side. Such expression does not mean that phosphorescent material and/or phase change material cannot be on or in any other portion of the first structure or any other structure, i.e., the first structure can contain phosphorescent material and/or phase change material in its interior, or an entire thickness of some or all of the first structure can be made of phosphorescent material and/or phase change material.

Figure 2:
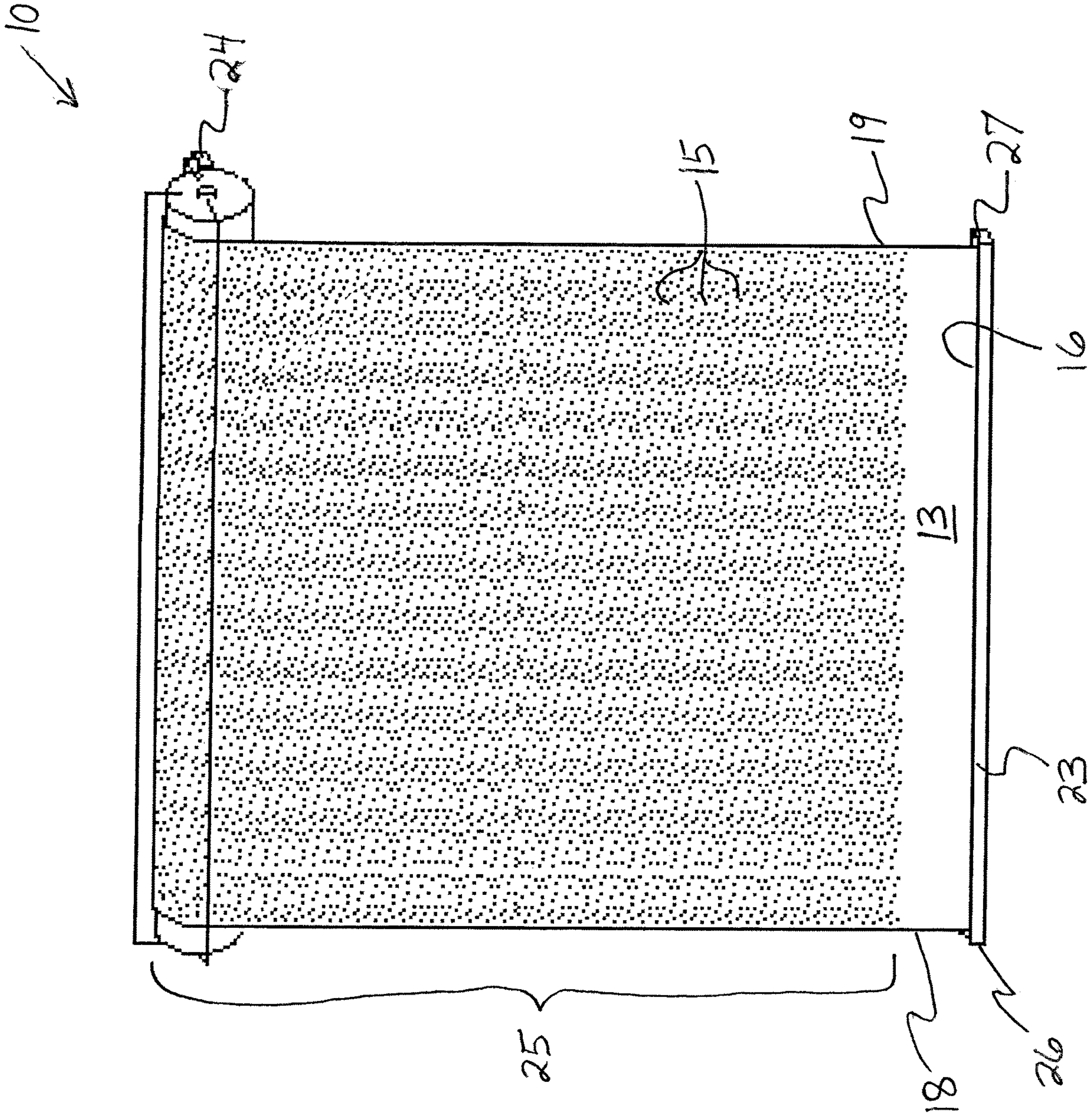
FIG. 2 is a schematic perspective view of the light absorbing and light emitting device 10 with the first structure 11 in a second position.
Figure 3:
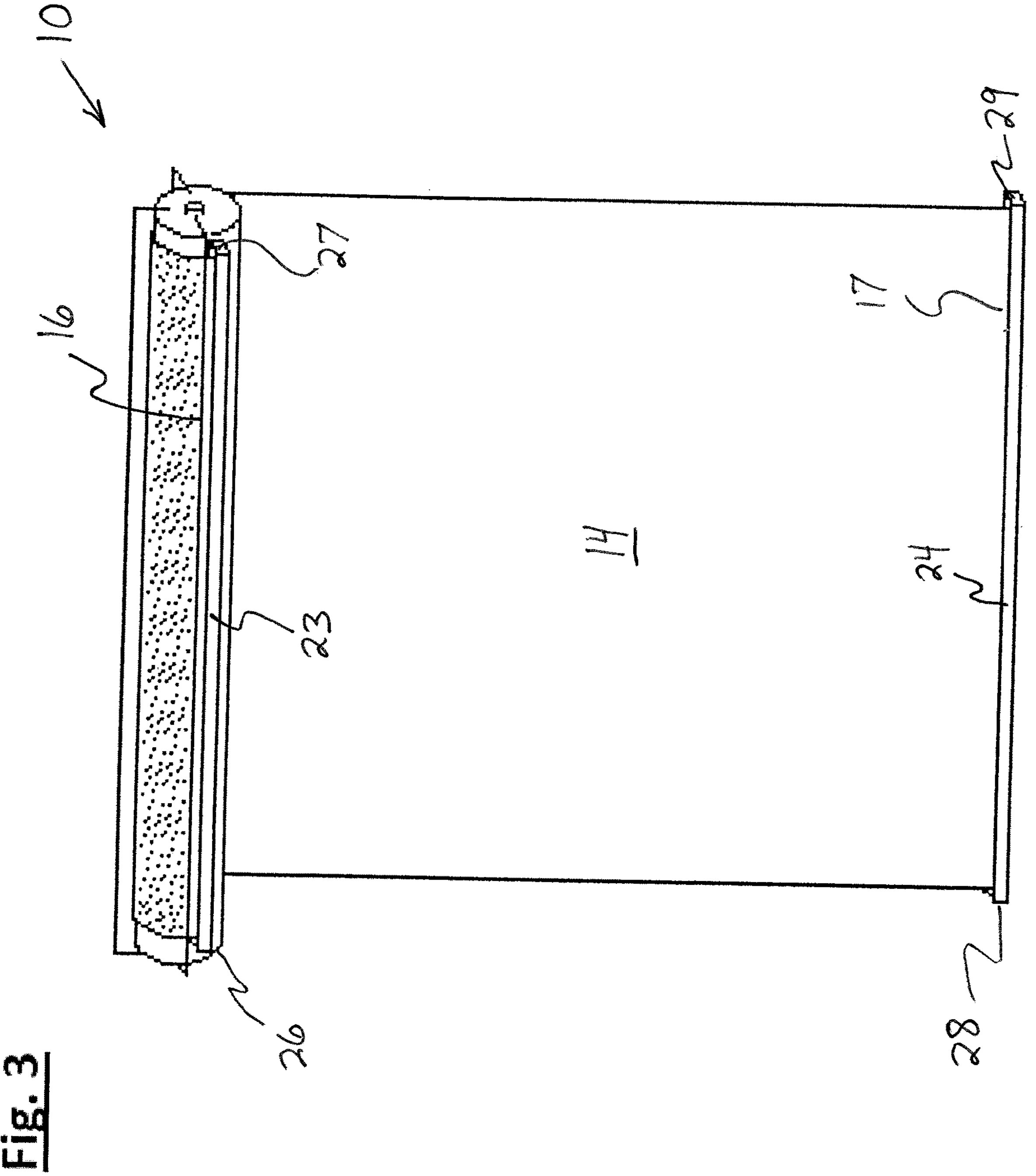
FIG. 3 is a schematic perspective view of the light absorbing and light emitting device 10 with the first structure 11 in a first position.

In devices in accordance with the present inventive subject matter, the first structure is movable relative to the holder at least between a first structure first position (in which the first side of the first portion faces a first direction) to a first structure second position (in which the first side of the first portion faces a second direction, the second direction different from the first direction). As indicated above, the first portion can comprise a part of the first structure or an entirety of the first structure. For example, in the embodiment depicted in FIGS. 1-7:

- with the first structure 11 in the position depicted in FIG. 6 (which depicts the first structure 11 in the same position as it is depicted in FIG. 2), which can be characterized as a first structure first position, the first side 13 of the first portion 61 faces to the right;
- with the first structure 11 in the position depicted in FIG. 7 (which depicts the first structure 11 in the same position as it is depicted in FIG. 3), which can be characterized as a first structure second position, the first side 13 of the first portion 61 faces to the left;
- the first structure 11 is movable between the position depicted in FIG. 6 and the position depicted in FIG. 7, i.e., it can move from the position depicted in FIG. 6 to the position depicted in FIG. 7 (or any portion of such movement) and it can move from the position depicted in FIG. 7 to the position depicted in FIG. 6 (or any portion of such movement), in any combination of such movements or portions of movements in any sequence, and it passes through every position between the endpoints of any such movement or portion of such movement.

The sliding movement of the first structure 11 (from the position depicted in FIG. 6 to the position depicted in FIG. 7) is one example of a way in which a first structure can be moved from its "first position" to its "second position." Any other way of moving the first structure from its "first position" to its "second position" is encompassed by the present inventive subject matter. For example, structural elements can be provided to rotate the first structure about any axis, e.g., relative to a vertical axis in the orientation depicted in FIGS. 1-3 (back and forth) between the orientation depicted in FIG. 2 and the orientation depicted in FIG. 3. In a method in accordance with the present inventive subject matter, a first structure can be rotated about any axis in any way, including by the action of one or more structural elements and/or by the action of a user.

FIGS. 5-7 are useful to illustrate the expression "first stop movement path" (or stop movement path of any other numerical indicator, e.g., "second"), in that it is readily seen that the first stop 23 moves up and down between the position in which it is shown in FIG. 6 and the position in which it is shown in FIG. 7, and so the first stop movement path would trace those positions, i.e., it would run along a straight, vertically oriented (in the orientation depicted in FIG. 6) line segment (and analogously, the second stop 24 moves up and down between the position in which it is shown in FIG. 6 and the position in which it is shown in FIG. 7). If, for example, the bracket 20 depicted in FIGS. 5-7 were positioned closer to the bracket 21 (e.g., moved clockwise in the orientation depicted in FIG. 6), the first stop movement path 23 would include the up and down movement described above in addition to a degree of circumferential movement (relative to the circumference of the holder 12) corresponding to the extent to which the bracket is rotated around the circumference of the holder 12.

In some embodiments in accordance with the present inventive subject matter which can include or not include, as suitable, any of the other features described herein, the first direction is substantially opposite to the second direction.

In some embodiments in accordance with the present inventive subject matter which can include or not include, as suitable, any of the other features described herein, the holder is substantially cylindrical.

In some embodiments in accordance with the present inventive subject matter which can include or not include, as suitable, any of the other features described herein, a planar surface defined by the first side of the first portion is substantially parallel to a planar surface defined by the second side of the first portion (or a second side of the first portion).

In some embodiments in accordance with the present inventive subject matter which can include or not include, as suitable, any of the other features described herein, the holder is substantially in the shape of a cylinder having a holder cylindrical axis and a holder cylindrical radius,

- the first structure comprises a first edge, a second edge, a third edge and a fourth edge,
- the first edge is substantially parallel to the second edge,
- the third edge is substantially parallel to the fourth edge,
- the first edge and the second edge are substantially parallel to the holder cylindrical axis. For example, in the embodiment depicted in FIGS. 1-7, the first structure 11 comprises a first edge 16, a second edge 17, a third edge 18, and a fourth edge 19. In some of such embodiments, the first edge is substantially perpendicular to the third edge, and/or the holder cylindrical radius is a distance that is not more than 5 percent of a largest dimension of the first structure.

In some embodiments in accordance with the present inventive subject matter which can include or not include, as suitable, any of the other features described herein, the light absorbing and light emitting device further comprises at least a first bracket, and the first bracket and the holder define a first structure-retaining region through which the first structure extends and in which it is slidably retained. For example, the embodiment depicted in FIGS. 1-7 comprises a first bracket 20, a second bracket 21, and a third bracket 22, and the first bracket 20 and the holder 12 define a region through which the first structure 11 extends and in which it is slidably retained (because the first stop 23 cannot fit through the region defined by the first bracket 20 and the holder 12, and the second stop 24 cannot fit through the region defined by the third bracket 22 and the holder 12).

In embodiments in accordance with the present inventive subject matter that comprise a bracket (or brackets), such bracket(s) can be made of any suitable material, composition or combination of materials, e.g., plastic or metal. Any such bracket(s) can be of any suitable shape, and can be attached (directly or indirectly) to a holder in any suitable way (e.g., by portions or protrusions of the bracket spring fitting into corresponding recesses in the holder, by welding, by screws, by rivets, by nails, by clamps, by an adhesive, etc.).

In embodiments in accordance with the present inventive subject matter that comprise a stop (or stops), such stop(s) can be made of any suitable material, composition or combination of materials, e.g., plastic or metal. Any such stop(s) can be of any suitable shape, and can be attached (directly or indirectly) to a first structure in any suitable way (e.g., by the first structure being wrapped around the stop, by stapling the first structure to the stop, by screws, by rivets, by nails, by clamps, by an adhesive, etc.).

In embodiments in accordance with the present inventive subject matter in which a bracket and a holder define a structure-retaining region through which the first structure extends and in which it is slidably retained, the bracket and the holder can be of any suitable shape to define a structure-retaining region that slidably retains the first structure. For example, as noted above, the expression "the first bracket and the holder define a region through which the first structure extends and in which it is slidably retained" encompasses [1] arrangements in which the first bracket and the holder define a closed loop (the expression "closed loop" means that at least one sequence of locations (such locations not necessarily all in a single plane) can be identified that together extends around the space, and in which every location in the sequence of locations is on the first bracket or on the holder), as well as [2] arrangements in which the first bracket and the holder do not define a closed loop (and yet the geometries are such that the first structure is retained in the space). For example, FIG. 12 depicts an arrangement 120 that comprises a first structure 121, a holder 122 and a bracket 123, in which the bracket 123 and the holder 122 define a closed loop through which the first structure 121 extends. As another example, FIG. 13 depicts an arrangement 130 that comprises a first structure 131, a holder 132 and a bracket 133, in which the bracket 133 and the holder 132 do not define a closed loop, and the geometries of the first structure 131, the holder 132 and the bracket 133 (comprising a first clip structure 134 and a second clip structure 135) are such that the first structure 131 is retained in the space that respective portions of the bracket 133 and the holder 132 partially surround (i.e., the first structure is retained because its width extends well beyond the gap 136 in both directions).

In some embodiments in accordance with the present inventive subject matter which can include or not include, as suitable, any of the other features described herein, [1] the light absorbing and light emitting device further comprises at least a first stop, [2] the first stop is attached to the first structure, and [3] the first stop, the first structure, the first bracket and the holder are shaped, sized and oriented such that the first stop is prevented from passing through the first structure-retaining region upon sliding movement of the first structure relative to the first structure-retaining region. In some of such embodiments:

- the holder is substantially in the shape of a cylinder having a holder cylindrical axis and a holder cylindrical radius,
- the first structure comprises a first edge, a second edge, a third edge and a fourth edge,
- the first edge is substantially parallel to the second edge,
- the third edge is substantially parallel to the fourth edge,
- the first edge and the second edge are substantially parallel to the holder cylindrical axis, and
- the first stop is attached to the first edge, and/or:

- the first stop extends from a first stop first end to a first stop second end, and
- at least one line segment that extends from the first stop first end to the first stop second end is substantially parallel to the holder cylindrical axis.

In embodiments in accordance with the present inventive subject matter in which a bracket and a holder define a first structure-retaining region through which the first structure extends and in which it is slidably retained, and a stop is attached to the first structure, and the stop, the first structure, the first bracket and the holder are shaped, sized and oriented such that the first stop is prevented from passing through the first structure-retaining region upon sliding movement of the first structure relative to the first structure-retaining region, the stop, the first structure, the first bracket and the holder can be of any respective suitable geometries such that the first stop does not pass through the first structure-retaining region, e.g., any of its dimensions that are non-parallel to the direction of sliding movement is/are larger than a dimension (or dimensions) of the first structure-retaining region in a same direction as such dimension, e.g., as depicted in FIGS. 6, 7, 10 and 11, in which a lateral dimension (in the illustration) of each of the stops is larger than a lateral dimension of the structure-retaining region (between the portions of the brackets that extend in a direction into the illustration and the nearest surface of the holder (as an alternative, the respective lengths of the stops in a direction into the illustration could be greater than the dimensions of the respective structure-retaining regions extending into the illustration).

In some embodiments in accordance with the present inventive subject matter which can include or not include, as suitable, any of the other features described herein:

- the light absorbing and light emitting device comprises at least a first bracket,
- the first bracket and the holder define a first structure-retaining region through which the first structure extends and in which it is slidably retained,
- the light absorbing and light emitting device comprises at least a first stop and a second stop,
- the first stop and the second stop are each attached to the first structure,
- the first stop, the first structure, the first bracket and the holder are shaped, sized and oriented such that the first stop is prevented from passing through the first structure-retaining region upon sliding movement of the first structure relative to the first structure-retaining region, and
- the first stop is spaced from the second stop.

In some of such embodiments:

- the holder is substantially in the shape of a cylinder having a holder cylindrical axis and a holder cylindrical radius,
- the first structure comprises a first edge, a second edge, a third edge and a fourth edge,
- the first edge is substantially parallel to the second edge,
- the third edge is substantially parallel to the fourth edge,
- the first edge and the second edge are substantially parallel to the holder cylindrical axis,
- the first stop is attached to the first edge, and
- the second stop is attached to the second edge.

In some embodiments in accordance with the present inventive subject matter which can include or not include, as suitable, any of the other features described herein:

- the light absorbing and light emitting device comprises at least a first bracket and a second bracket,
- the first bracket and the holder define a first structure-retaining region through which the first structure extends and in which it is slidably retained,
- the second bracket and the holder define a second structure-retaining region through which the first structure extends and in which it is slidably retained,
- the light absorbing and light emitting device comprises at least a first stop and a second stop,
- the first stop and the second stop are each attached to the first structure,
- the first stop, the first structure, the first bracket and the holder are shaped, sized and oriented such that the first stop is prevented from passing through the first structure-retaining region,
- the second stop, the first structure, the second bracket and the holder are shaped, sized and oriented such that the second stop is prevented from passing through the second structure-retaining region, and the first stop is spaced from the second stop.

In some of such embodiments:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, the first stop is attached to the first edge, and the second stop is attached to the second edge.

In some embodiments in accordance with the present inventive subject matter which can include or not include, as suitable, any of the other features described herein, the holder is rotatable about a first holder axis, and rotating the holder about the first holder axis causes the first structure to wrap around the holder. Persons of skill in the art are familiar with a variety of devices in which rotating a first element about its axis results in a second element becoming wrapped around the first element (e.g., a wide variety of window shades), and any of such arrangements are encompassed by the present inventive subject matter.

In some embodiments in accordance with the present inventive subject matter which can include or not include, as suitable, any of the other features described herein, the holder is rotatable about a first holder axis, and the light absorbing and light emitting device further comprises a spring-loading element which, when actuated, causes the holder to rotate about the first holder axis, which causes at least part of the first structure to wrap around the holder. Persons of skill in the art are familiar with a variety of spring-loading elements (e.g., a variety of spring-loading elements used in window shades). Among representative examples of such spring-loading elements include any of the well-known spring-loading elements that are provided in window shades which, upon the window shades being pulled away from the spring-loading element (e.g., downward), alternatingly [1] hold the shade in place and [2] exert force capable of retracting the window shade, i.e., after such a spring-loading element retracts a window shade partially or completely, the window shade can be pulled down to a desired position and, when released, it does not move; thereafter, pulling down on the shade again actuates the spring-loading element so that the spring-loading element exerts a force capable of retracting the window shade by rotating the shade holder about its axis, resulting in the shade being wrapped around the shade holder. In some of such embodiments, actuating the spring-loading element causes the holder to rotate about the first holder axis until at least 75 percent of the first structure is wrapped around the holder, and/or the spring-loading element can be actuated by applying force to the first structure.

As noted above, a fourth aspect of the present inventive subject matter relates to a light admitting, light absorbing and light emitting assembly, comprising a first light-transmitting structure and a any of the light absorbing and light emitting devices as described herein. In such embodiments, the first light-transmitting structure can comprise any suitable light-transmitting structure, a wide variety of which are well-known to persons of skill in the art (e.g., any kind of window, any kind of door that comprises a light-transmitting region, such as a glass or plastic region, or any other kind of structure that has at least one light-transmitting region), and/or the holder can be fixed relative to the first light-transmitting structure.

In some embodiments in accordance with the fourth aspect of the present inventive subject matter, which can include or not include, as suitable, any of the other features described herein, the first side of the first portion of the first structure is movable, by sliding the first structure relative to the holder, to a position where it is substantially parallel to a surface of the first light-transmitting structure.

As noted above, a sixth aspect of the present inventive subject matter relates to a light absorbing and light emitting device, comprising:

a plurality of first structures; and a holder assembly, each of the first structures is supported by the holder assembly, for each of the first structures:

at least a first portion of the first structure has a first side, the first portion of the first structure comprises at least one phosphorescent material and/or at least one phase change material, the first structure is movable relative to the holder assembly at least between a first structure first position and a first structure second position, in the first structure first position, the first side of the first portion faces a first direction, in the first structure second position, the first side of the first portion faces a second direction, and the first direction differs from the second direction.

The first structures in the sixth aspect of the present inventive subject matter can each be made of any suitable material, composition or combination of materials. The materials, compositions and/or combinations of materials for use in making the first structures in the sixth aspect of the present inventive subject matter can be any of the materials, compositions and/or combinations of materials described above in connection with other aspects of the present inventive subject matter. Any first structure in a device in accordance with the sixth aspect of the present inventive subject matter can be made of a material, a composition and/or a combination of material that is the same or is similar to, or different from, the material, composition and/or combination of materials that is used to make any other first structure in such device.

Any suitable component or combination of components can be used as the holder assembly in a device in accordance with the sixth aspect of the present inventive subject matter. In some embodiments, for example, the holder assembly can comprise a rigid member and a plurality of flexible elements (e.g., made of string and each attached to the rigid member), in which the flexible elements comprise at least two strands that each comprise a tiltable support element for each first structure (the tilting of which causes each first structure to move between its respective first and second positions), and/or a third support region that can be moved to shorten the distance occupied by the collection of first structures.

Holder assemblies that are suitable for use in the sixth aspect of the present inventive subject matter are well-known to persons of skill in the art. For example, various holder assemblies have been employed (and are well-known) in a wide variety of horizontal and vertical blinds. Any of such holder assemblies can be employed in devices in accordance with the sixth aspect of the present inventive subject matter. Through simple manipulation of a tilt actuator (e.g., twisting of a stick, pulling of a string or a chain, rotation of a flexible loop, etc.), tiltable (or twirlable) support elements in holder assemblies can be tilted (or twirled) to move first structures that are supported by such tiltable (or twirlable) support elements between a position in which a first side of each first structure faces in a first direction and a position in which the first side of each first structure faces in a second direction (e.g., a first position in which a first side of each first structure faces a window or door, a second position in which the first side of each first structure faces away from the window or door and into a room, and intermediate positions, including an intermediate position in which the first side of each first structure is perpendicular to the window, e.g., faces up or down in the case of horizontal blinds, or faces left or right in the case of vertical blinds). Likewise, through simple manipulation (e.g., downward pulling of a string or a set of strings, and/or actuating a strand length altering actuator), the space occupied by the first structures can be reduced, e.g., an actuating string that extends through holes in each of the first structures has a remote end that cannot fit through the holes, and pulling the string such that the remote end of the actuating string is moved toward the holder assembly (e.g., with the first structures tilted with their first sides facing up or down) causes the lowest first structure to move upward into contact with the second lowest first structure, and continued pulling of the string causes the lowest first structure and the second lowest first structure to move upward so that the second lowest first structure comes into contact with the third lowest first structure, etc., and continued pulling of the string eventually results in all of the first structures moving to a stacked arrangement (i.e., an arrangement in which a substantial entirety of the major surfaces of each of the first structures are facing and/or in contact with a substantial entirety of a major surface of a neighboring first structure, and/or there is substantially no space therebetween, and/or they are in close proximity).

The present inventive subject matter relates to vertically oriented first structures (e.g., vertical blinds, in which the largest dimension of each of the first structure is substantially vertical) as well as horizontally oriented first structures (e.g., horizontal blinds, in which the largest dimension of each of the first structure is substantially horizontal), as well as devices with first structures arranged in any other orientation, and so any reference to verticality (e.g., up, down, etc.) should be understood, where appropriate, in an analogous way in devices in which the first structures are oriented in other ways.

As noted above, a fifth aspect of the present inventive subject matter relates to a method of absorbing light and emitting light, comprising moving at least one first structure (in any of the devices disclosed herein as being within the scope of the present inventive subject matter) from a first structure first position to a first structure second position.

In some embodiments in accordance with the fifth aspect of the present inventive subject matter, which can include or not include, as suitable, any of the other features described herein, the method further comprises sliding the first structure relative to a first structure-retaining region such that a first stop (attached to the first structure) moves along at least part of a first stop movement path that extends until the first stop comes into contact with a first bracket, thereby preventing the first structure from being slid farther in a way that would cause the first stop to move beyond the location where it contacts the first bracket.

In some embodiments in accordance with the fifth aspect of the present inventive subject matter, which can include or not include, as suitable, any of the other features described herein, the method further comprises:

sliding the first structure relative to a first structure-retaining region such that a first stop (attached to the first structure) moves along at least part of a first stop movement path that extends until the first stop would come into contact with a first bracket, thereby preventing the first structure from being slid farther in a way that would cause the first stop to move beyond the location where it contacts the first bracket, and then sliding the first structure relative to the first structure-retaining region such that a second stop moves along at least part of a second stop movement path that extends until the second stop would come into contact with the first bracket (or with a second bracket), thereby preventing the first structure from being slid farther in a way that would cause the second stop to move beyond the location where it contacts the first bracket (or the second bracket).

In some embodiments in accordance with the fifth aspect of the present inventive subject matter, which can include or not include, as suitable, any of the other features described herein, the method further comprises rotating the holder about a first holder axis, thereby causing the first structure to wrap around the holder.

In some embodiments in accordance with the fifth aspect of the present inventive subject matter, which can include or not include, as suitable, any of the other features described herein, the method further comprises actuating a spring-loading element, which causes the holder to rotate about a first holder axis, which causes at least part of the first structure to wrap around the holder (in some of such embodiments, until at least 75 percent of the first structure is wrapped around the holder).

In some embodiments in accordance with the fifth aspect of the present inventive subject matter, which can include or not include, as suitable, any of the other features described herein, the method further comprises applying force to the first structure to actuate a spring-loading element.

In some embodiments in accordance with the fifth aspect of the present inventive subject matter, which can include or not include, as suitable, any of the other features described herein, the method further comprises rotating the holder about a first holder axis to an extent that at least 50 percent of third and fourth edges of the first structure (which third and fourth edges are substantially perpendicular to first and second edges of the first structure, which first and second edges are substantially parallel to a holder axis) are wrapped around the holder.

In some embodiments in accordance with the fifth aspect of the present inventive subject matter, which can include or not include, as suitable, any of the other features described herein, the method further comprises applying force to the first structure, thereby actuating a spring-loading element, thereby causing the holder to rotate about a first holder axis, which causes the first structure to wrap around the holder.

Embodiments in accordance with the present inventive subject matter are described herein in detail in order to provide exact features of representative embodiments that are within the overall scope of the present inventive subject matter, and to provide examples that illustrate how terms and expressions defined herein are use. It should be understood that the present inventive subject matter is not limited to such detail.

FIGS. 1-7 depict a first representative embodiment of a light absorbing and light emitting device 10 in accordance with the present inventive subject matter. The light absorbing and light emitting device 10 comprises a first structure 11, a holder 12, a first bracket 20, a second bracket 21, and a third bracket 22 (the quantity of brackets can readily be altered, e.g., a light absorbing and light emitting device in accordance with the present inventive subject matter can have a single bracket, two brackets, or any other suitable number of brackets).

The first structure 11 comprises a first side 13 and a second side 14.

FIG. 4A is a schematic sectional view of the holder 12 held by a first receptacle 41 and a second receptacle 42. The first receptacle 41 and the second receptacle 42 are not part of the light absorbing and light emitting device 10, and they provide structure that can support the holder 12 in a desired location, e.g., in front of a window (for example, by attaching the first receptacle 41 and the second receptacle 42 to a wall structure on opposite sides (e.g., right and left) of such window). The holder 12 has a first protrusion 31 that fits in and is supported in the first receptacle, and a second protrusion 32 that fits in and is supported in the second receptacle.

FIG. 3 is a schematic perspective view of the light absorbing and light emitting device 10 with the first structure 11 in a first position.

FIG. 2 is a schematic perspective view of the light absorbing and light emitting device 10 with the first structure 11 in a second position.

FIG. 1 is a schematic perspective view of the light absorbing and light emitting device 10 with the first structure 11 in an intermediate position between the first position and the second position.

FIG. 5 is a schematic side view of the light absorbing and light emitting device 10 with the first structure 11 in an intermediate position.

FIG. 6 is a schematic side view of the light absorbing and light emitting device 10 with the first structure 11 in the first position.

FIG. 7 is a schematic side view of the light absorbing and light emitting device 10 with the first structure 11 in the second position.

The first structure 11 comprises a first edge 16, a second edge 17, a third edge 18 and a fourth edge 19.

A first stop 23 is connected to the first edge 16, and a second stop 24 is connected to the second edge 17.

The first structure 11 (to which the first stop 23 and the second stop 24 are connected) is supported by the holder 12.

Phosphorescent material and/or phase change material 15 is provided on a first portion 25 of the first structure 11 (see FIGS. 2, 6 and 7).

The first portion 25 of the first structure 11 is flexible and sheet-like.

The first portion 25 of the first structure 11 prevents at least some light from passing through the first portion 25 of the first structure 11 from the first side 13 to the second side 14 (or from the second side 14 to the first side 13).

The first structure 11 is movable relative to the holder 12 between a first structure first position (depicted in FIG. 3) and a first structure second position (depicted in FIG. 2), as well as intermediate positions (e.g., the intermediate position depicted in FIG. 1) between the first position and the second position. The expression "between the first position and the second position" means that the first structure 11 can be moved to the first structure first position, and to the first structure second position, and optionally any intermediate position (or intermediate positions) in any sequence. In addition, the statement that "the first structure 11 is movable relative to the holder 12 between a first structure first position . . . and a first structure second position . . . , as well as intermediate positions . . . between the first position and the second position" does not preclude the possibility or option that the first structure 11 can be moved to some other position or positions.

In the embodiment depicted in FIGS. 1-7, the first edge 16, the second edge 17, the third edge 18 and the fourth edge 19 are all substantially straight. Any or all of these edges, however, can be other than straight, i.e., each can be of any suitable shape, and any edge can have a shape that differs from the shape (or shapes) of any other (or others) of the edges.

In the first structure first position depicted in FIG. 3, the first side 13 of the first portion 25 faces a first direction; in the first structure second position depicted in FIG. 2, the first side of the first portion 25 faces a second direction, and the first direction differs from the second direction (and the first direction is substantially opposite to the second direction).

In the embodiment depicted in FIGS. 1-7, the holder 12 is substantially in the shape of a cylinder having a holder cylindrical axis 30 and a holder cylindrical radius.

In the embodiment depicted in FIGS. 1-7, the holder cylindrical radius is a distance that is not more than 5 percent of a largest dimension of the first structure 11.

In the embodiment depicted in FIGS. 1-7, a planar surface defined by the first side 13 of the first portion 25 is substantially parallel to a planar surface defined by the second side 14 of the first portion 25.

In the embodiment depicted in FIGS. 1-7:

- the first structure comprises a first edge, a second edge, a third edge and a fourth edge,
- the first edge is substantially parallel to the second edge,
- the third edge is substantially parallel to the fourth edge, and
- the first edge is substantially perpendicular to the third edge.

In the embodiment depicted in FIGS. 1-7, the first edge 16 and the second edge 17 are substantially parallel to the holder cylindrical axis 30.

In the embodiment depicted in FIGS. 1-7:

- the first bracket 20 and the holder 12 define a first structure-retaining region through which the first structure 11 extends and in which it is slidably retained;
- the second bracket 21 and the holder 12 define a second structure-retaining region through which the first structure 11 extends and in which it is slidably retained; and
- the third bracket 22 and the holder 12 define a third structure-retaining region through which the first structure 11 extends and in which it is slidably retained.

In the embodiment depicted in FIGS. 1-7, the light absorbing and light emitting device 10 further comprises at least a first stop 23 which is attached to the first edge 16 of the first structure 11, and a second stop 24 which is attached to the second edge 17 of the first structure 11.

In the embodiment depicted in FIGS. 1-7:

- the first stop 23, the first structure 11, the first bracket 20 and the holder 12 are shaped, sized and oriented such that the first stop 23 is prevented from passing through the first structure-retaining region upon sliding movement of the first structure 11 relative to the first structure-retaining region (FIG. 6 depicts the light absorbing and light emitting device 10 with the first structure 11 having been slid relative to the first structure-retaining region as far as it can slide in a direction by which the first stop 23 moves upward (in the orientation depicted in FIG. 6), and by which the movement of the first structure 11, while in contact with the holder 12 is clockwise, i.e., to the point where the first stop 23 is stopped by the first bracket 20 from being moved farther upward and/or clockwise around the circumference of the holder 12), and the second stop 24, the first structure 11, the third bracket 22 and the holder 12 are shaped, sized and oriented such that the second stop 24 is prevented from passing through the third structure-retaining region upon sliding movement of the first structure 11 relative to the third structure-retaining region (FIG. 7 depicts the light absorbing and light emitting device 10 with the first structure 11 having been slid relative to the third structure-retaining region as far as it can slide in a direction by which the second stop 24 moves upward and the first stop 23 moves downward (in the orientation depicted in FIG. 6), and by which the movement of the first structure 11, while in contact with the holder 12 is counter-clockwise, i.e., to the point where the second stop 24 is stopped by the third bracket 22 from being moved farther upward and/or counter-clockwise around the circumference of the holder 12).

In the embodiment depicted in FIGS. 1-7, in addition, the first stop 23, the second stop 24, the first structure 11, the first bracket 20, the second bracket 21, the third bracket 22 and the holder 12 are shaped, sized and oriented such that the first stop and the second stop are each prevented from passing through any of the first, second and third structure-retaining regions upon sliding movement of the first structure 11 relative to the first, second and third structure-retaining regions, i.e., any one of the first bracket 20, the second bracket 21 and the third bracket 22 would prevent the first stop 23 or the second stop 24 from sliding beyond where it comes into contact with the respective bracket.

In the embodiment depicted in FIGS. 1-7, the first stop 23 extends from a first stop first end 26 to a first stop second end 27, and at least one line segment that extends from the first stop first end 26 to the first stop second end 27 is substantially parallel to the holder cylindrical axis 30.

In the embodiment depicted in FIGS. 1-7, the second stop 24 extends from a second stop first end 28 to a second stop second end 29, and at least one line segment that extends from the second stop first end 28 to the second stop second end 29 is substantially parallel to the holder cylindrical axis 30.

In the embodiment depicted in FIGS. 1-7, the holder 12 is rotatable about a first holder axis (in this embodiment, the holder cylindrical axis 30), and rotating the holder 12 about the holder cylindrical axis 30 clockwise (in the orientation depicted in FIGS. 5-7) causes the first structure 11 to move toward the first structure first position, while rotating the holder 12 about the holder cylindrical axis 30 counter-clockwise (in the orientation depicted in FIGS. 5-7) causes the first structure 11 to move toward the first structure second position. Alternatively, in other embodiments, the holder 12 can be non-rotatable about its axis, and the first structure can be moved slidably relative to the outer curved surface of the holder 12. Alternatively, in other embodiments, the holder 12 can be rotatable about its axis, and rotating the holder 12 about its axis can cause the first structure to move (as discussed above) and the first structure can also be moved relative to the outer curved surface of the holder 12. Friction between the outer curved surface of the holder 12 and the first structure 11 can be tailored to provide the desired type of movement (or non-movement) of the first structure 11 relative to the outer curved surface of the holder 12 depending on the amount of force applied to the first structure 11.

In other alternative embodiments, there is provided a structure and/or a feature that allows (or facilitates) the first structure 11 being wound around the holder 12 at least to some degree. In such embodiments, by winding the first structure around the holder 12, the first structure blocks light over a smaller area, e.g., if the light absorbing and light emitting device is located in front of a window, a larger portion of the window can be exposed (e.g., a larger portion of the window is visible from within a room in which the window is located, so that more light can enter the room through the window). An example of such a feature is where the first bracket 20 and the third bracket 22 are not included, and the second bracket 21 can be pressed toward the holder 12 to trap the first structure 11, whereby the friction between the first structure 11 and the second bracket 21/holder 12 is high enough that rotating the holder 12 about its axis results in the first structure 11 wrapping around the holder 12.

In some embodiments, the holder 12 is spring-loaded, such that when actuated, the holder 12 rotates about its axis, thereby causing the first structure to move between the first position and the second position, and/or causing the first structure to wrap around the holder 12. Such spring-loading can be provided in any suitable way, persons of skill in the art, e.g., in the art of window shades, being familiar with a variety of ways to spring-load an element such as a holder 12. FIG. 4B schematically depicts a protrusion 43 (connected to a holder, not shown), a receptacle 44 and a spring-loading element 45 that provides spring-loading to the holder. The spring-loading element 45 can be actuated by applying force to a first structure attached to the holder (e.g., by pulling a first stop down slightly, or by pulling a first edge of the first structure down slightly.

FIG. 8 is a schematic perspective view of a light absorbing and light emitting device 80 comprising a first structure 81 (suitable for use, e.g., in place of the first structure 11 in the embodiment depicted in FIGS. 1-7) that comprises a plurality of first structure sub-elements 82 that are flexibly connected to each other, each sub-element 82 comprising a first side 83 and a second side 84, with phosphorescent material and/or phase change material 85 on the respective first sides 83. FIG. 8 depicts the first structure 81 supported by a holder 86, in a way that is analogous to how the first structure 11 is supported by the holder 12. In the embodiment depicted in FIG. 8, the first structure sub-elements 82 can be of any rigidity (i.e., they can be flexible, rigid, or semi-rigid), and the first structure 81 is flexible due to the first structure sub-elements 82 being flexibly connected to each other. The light absorbing and light emitting device 80 can, if desired, comprise stops and/or brackets, analogous to the embodiment depicted in FIGS. 1-7.

FIGS. 9-11 depict a light admitting, light absorbing and light emitting assembly 90 that comprises a light absorbing and light emitting device 91 and a first light-transmitting structure 92.

In the embodiment depicted in FIGS. 9-11, the light absorbing and light emitting device 91 can be any light absorbing and light emitting device as described herein, e.g., a light absorbing and light emitting device as described in connection with the embodiment depicted in FIGS. 1-7 or the embodiment depicted in FIG. 8.

In the embodiment depicted in FIGS. 9-11, the first light-transmitting structure 92 can be any light-transmitting structure, e.g., a window or glass in a door.

The light absorbing and light emitting device 91 comprises a first structure 93, a holder 94, and phosphorescent material and/or phase change material 96 on a first portion 98 of a first side 97 of the first structure 93.

In the embodiment depicted in FIGS. 9-11, the holder 94 is fixed relative to the first light-transmitting structure 92.

FIG. 9 is a schematic perspective view of the light admitting, light absorbing and light emitting assembly 90.

FIG. 10 is a schematic perspective view of the light admitting, light absorbing and light emitting assembly 90 depicted in FIG. 9, with the first structure 93 in a first structure first position, in which the first side 97 of the first portion 98 of the first structure 93 faces the first light-transmitting structure 92.

FIG. 11 is a schematic perspective view of the light admitting, light absorbing and light emitting assembly 90 depicted in FIG. 9, with the first structure 93 in a first structure second position, in which the first side 97 of the first portion 98 of the first structure 93 faces away from the first light-transmitting structure 92.

In FIG. 9, the first structure 93 is in an intermediate position between the first structure first position and the first structure second position.

In FIG. 10, the first side 97 of the first portion 98 of the first structure 93 is substantially parallel to a surface of the first light-transmitting structure 92.

In the embodiment depicted in FIGS. 9-11, the first light-transmitting structure 92 comprises glass.

In the embodiment depicted in FIGS. 9-11, the first light-transmitting structure 92 is part of a window 99.

A first representative embodiment of a method in accordance with the present inventive subject matter comprises moving the first structure 11 (of the light absorbing and light emitting device 10 depicted in FIGS. 1-7) from the first structure first position (depicted in FIG. 3 and in FIG. 6) to the first structure second position (depicted in FIG. 2 and in FIG. 7)(or moving the first structure 93 of the light absorbing and light emitting device 91 from the first structure first position, depicted in FIG. 10, to the first structure second position, depicted in FIG. 11). Such a method comprises sliding the first structure 11 relative to the first structure-retaining region such that the first stop 23 moves along a first stop movement path until the first stop 23 comes into contact with the first bracket 20, thereby preventing the first structure 11 from being slid farther in a way that would cause the first stop 23 to move beyond the location where it contacts the first bracket 20. Such a method can further comprise sliding the first structure 11 relative to the first structure-retaining region such that the second stop 24 moves along a second stop movement path until the second stop 24 comes into contact with the third bracket 22, thereby preventing the first structure 11 from being slid farther in a way that would cause the second stop 24 to move beyond the location where it contacts the third bracket 22, and/or applying force to the first structure 11 to actuate a spring-loading element to cause the holder 12 to rotate about the holder cylindrical axis 30, which causes at least part of the first structure 11 to wrap around the holder 12.

FIGS. 14-16 depict a second representative embodiment of a light absorbing and light emitting device 140 in accordance with the present inventive subject matter. The light absorbing and light emitting device 140 comprises a plurality of first structures 141 and a holder assembly 142. Each of the first structures 141 is supported by the holder assembly 142.

FIG. 15 is a schematic perspective view of the light absorbing and light emitting device 140 with each of the first structures 141 in a respective first structure first position.

FIG. 16 is a schematic perspective view of the light absorbing and light emitting device 140 with each of the first structures 141 in a respective first structure second position.

FIG. 14 is a schematic perspective view of the light absorbing and light emitting device 140 with each of the first structures 141 in a respective intermediate position between its respective first structure first position and its respective first structure second position.

For each of the first structures 141:

at least a first portion of the first structure 141 has a first side 143, the first portion of the first structure 141 comprises at least one phosphorescent material and/or at least one phase change material 144 on the first side 143, the first structure 141 is movable relative to the holder assembly 142 between its respective first structure first position and its respective first structure second position, in the first structure first position, the first side 143 of the first portion faces a first direction 145, in the first structure second position, the first side 143 of the first portion faces a second direction 146, and the first direction differs from the second direction.

In the embodiment depicted in FIGS. 14-16, the first structures 141 have respective first sides 143 that define respective planes that are substantially parallel to each other.

In the embodiment depicted in FIGS. 14-16, the holder assembly 142 comprises a plurality of strings, including a pair of first strings 147, a pair of second strings 148, a pair of third strings 149, and a plurality of string loops 150 (in FIGS. 14-16, strings and string loops on the right and left sides are shown; alternatively, any number of sets of strings and string loops can be provided, e.g., a total of three, a total of four, etc.). A respective two of the string loops 150 extend around each first structure 141 (one string loop 150 near each end of each first structure 141). Each of the first strings 147 extends through holes extending through each of the first structures 141, and each is tied beneath the lowest first structure 141 (and/or is tied to a structure that is dimensioned to resist passage through the hole) to prevent the lowest first structure 141 from sliding off the ends of the first strings 147. Near each end of each first structure, one of the second strings 148 and one of the third strings 149 are connected to opposite sides of each of the string loops 150. Each string loop 150 is a tiltable support element which can be tilted (by movement of one or both of the strings 148 and 149 to which it is connected) to move each first structure 141 between its respective first structure first position and its first structure second position, as well as intermediate positions, including an intermediate position in which the first side of each first structure is perpendicular to the window, e.g., faces upward as shown in FIG. 14. By moving the first structures 141 to their respective intermediate positions as shown in FIG. 14 and then pulling the first strings 147, the space occupied by the first structures can be reduced, until the first structures 141 move to a stacked arrangement (i.e., an arrangement in which a substantial entirety of the major surfaces of each of the first structures are facing and/or in contact with a substantial entirety of a major surface of a neighboring first structure, and/or there is substantially no space therebetween, and/or they are in close proximity), i.e., an arrangement as depicted in FIG. 17.

In the embodiment depicted in FIGS. 14-16, the holder assembly 142 comprises a tilt actuator 151. Twisting the tile actuator 151 causes one or both of the strings 148 and 149 to move, whereby the string loops 150 can be tilted to move each of the first structures 141 between its respective first structure first position and its first structure second position, as well as intermediate positions.

FIG. 17 is a schematic perspective view of the light absorbing and light emitting device 140 with the first structures 141 in a stacked arrangement. In the arrangement depicted in FIG. 17:

each of the first structures 141 comprises a first edge 171, a second edge 172, a third edge 173 and a fourth edge 174, for each of the first structures 141, a perimeter of the first side 143 is defined by the first edge 171, the second edge 172, the third edge 173 and the fourth edge 174 of such first structure 141, for each of the first structures 141, the first edge 171 is substantially parallel to the second edge 172 (and the first edge 171 and the second edge 172 are substantially perpendicular to an axis that extends through the plurality of first structures 141), the third edge 173 is substantially parallel to the fourth edge 174, and the third edge 173 and the fourth edge 174 are substantially perpendicular to the first edge 171 and the second edge 172.

for each of the first structures 141, the first edge 171 and the second edge 172 are each at least 5 times as long as the third edge 173 and at least 5 times as long as the fourth edge 174, for each of the first structures 141, there is substantially no space between the first edge 171 and a first edge of an adjacent first structure, and for each of the first structures 141, there is substantially no space between the second edge 172 and a second edge of an adjacent first structure.

Below are a series of numbered passages, each of which defines subject matter within the scope of the present inventive subject matter:

Passage 1. A light absorbing and light emitting device, comprising:

a first structure; and a holder, the first structure is supported by the holder, at least a first portion of the first structure is flexible and sheet-like, the first portion of the first structure has a first side and a second side, the first portion of the first structure comprises at least one phosphorescent material and/or at least one phase change material, the first structure is movable relative to the holder at least between a first structure first position and a first structure second position, in the first structure first position, the first side of the first portion faces a first direction, in the first structure second position, the first side of the first portion faces a second direction, and the first direction differs from the second direction.

Passage 2. A light absorbing and light emitting device as recited in passage 1 or passage 2, wherein the first direction is substantially opposite to the second direction.

Passage 3. A light absorbing and light emitting device as recited in passage 1, wherein the holder is substantially cylindrical.

Passage 4. A light absorbing and light emitting device as recited in any one of passages 1-3, wherein a planar surface defined by the first side of the first portion is substantially parallel to a planar surface defined by the second side of the first portion.

Passage 5. A light absorbing and light emitting device as recited in any one of passages 1-4, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, and the first edge and the second edge are substantially parallel to the holder cylindrical axis.

Passage 6. A light absorbing and light emitting device as recited in passage 5, wherein the first edge is substantially perpendicular to the third edge.

Passage 7. A light absorbing and light emitting device as recited in passage 5 or passage 6, wherein the holder cylindrical radius is a distance that is not more than 5 percent of a largest dimension of the first structure.

Passage 8. A light absorbing and light emitting device as recited in any one of passages 1-7, wherein:

the light absorbing and light emitting device further comprises at least a first bracket, and the first bracket and the holder define a first structure-retaining region through which the first structure extends and in which it is slidably retained.

Passage 9. A light absorbing and light emitting device as recited in passage 8, wherein:

the light absorbing and light emitting device further comprises at least a first stop, the first stop is attached to the first structure, and the first stop, the first structure, the first bracket and the holder are shaped, sized and oriented such that the first stop is prevented from passing through the first structure-retaining region upon sliding movement of the first structure relative to the first structure-retaining region.

Passage 10. A light absorbing and light emitting device as recited in passage 9, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, and the first stop is attached to the first edge.

Passage 11. A light absorbing and light emitting device as recited in passage 10, wherein:

the first stop extends from a first stop first end to a first stop second end, and at least one line segment that extends from the first stop first end to the first stop second end is substantially parallel to the holder cylindrical axis.

Passage 12. A light absorbing and light emitting device as recited in passage 8, wherein:

the light absorbing and light emitting device further comprises at least a first stop and a second stop, the first stop and the second stop are each attached to the first structure, the first stop, the first structure, the first bracket and the holder are shaped, sized and oriented such that the first stop is prevented from passing through the first structure-retaining region upon sliding movement of the first structure relative to the first structure-retaining region, and the first stop is spaced from the second stop.

Passage 13. A light absorbing and light emitting device as recited in passage 12, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, the first stop is attached to the first edge, and the second stop is attached to the second edge.

Passage 14. A light absorbing and light emitting device as recited in any one of passages 1-13, wherein the holder is rotatable about a first holder axis.

Passage 15. A light absorbing and light emitting device as recited in passage 14, wherein rotating the holder about the first holder axis causes the first structure to wrap around the holder.

Passage 16. A light absorbing and light emitting device as recited in passage 15, wherein the holder is substantially cylindrical.

Passage 17. A light absorbing and light emitting device as recited in passage 14, wherein:

the light absorbing and light emitting device further comprises a spring-loading element, and the spring-loading element, when actuated, causes the holder to rotate about the first holder axis, which causes at least part of the first structure to wrap around the holder.

Passage 18. A light absorbing and light emitting device as recited in passage 17, wherein actuating the spring-loading element causes the holder to rotate about the first holder axis until at least 75 percent of the first structure is wrapped around the holder.

Passage 19. A light absorbing and light emitting device as recited in passage 17 or passage 18, wherein the spring-loading element can be actuated by applying force to the first structure.

Passage 20. A light absorbing and light emitting device as recited in any one of passages 1-19, wherein:

the holder is substantially cylindrical, the holder comprises a holder cylindrical axis, and the holder is rotatable about the holder cylindrical axis.

Passage 21. A light absorbing and light emitting device as recited in passage 20, wherein rotating the holder about the first holder axis causes the first structure to wrap around the holder.

Passage 22. A light absorbing and light emitting device, comprising:

a first structure; and a holder, the first structure is supported by the holder, at least a first portion of the first structure has a first side, the first portion of the first structure comprises at least one phosphorescent material and/or at least one phase change material, the first structure is movable relative to the holder at least between a first structure first position and a first structure second position, in the first structure first position, the first side of the first portion faces a first direction, in the first structure second position, the first side of the first portion faces a second direction, and the first direction differs from the second direction.

Passage 23. A light absorbing and light emitting device as recited in passage 22, wherein the first direction is substantially opposite to the second direction.

Passage 24. A light absorbing and light emitting device as recited in passage 22 or passage 23, wherein the holder is substantially cylindrical.

Passage 25. A light absorbing and light emitting device as recited in any one of passages 22-24, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, and the first edge and the second edge are substantially parallel to the holder cylindrical axis.

Passage 26. A light absorbing and light emitting device as recited in passage 25, wherein the first edge is substantially perpendicular to the third edge.

Passage 27. A light absorbing and light emitting device as recited in passage 25 or passage 26, wherein the holder cylindrical radius is a distance that is not more than 5 percent of a largest dimension of the first structure.

Passage 28. A light absorbing and light emitting device as recited in any one of passages 22-27, wherein:

the light absorbing and light emitting device further comprises at least a first bracket, and the first bracket and the holder define a first structure-retaining region through which the first structure extends and in which it is slidably retained.

Passage 29. A light absorbing and light emitting device as recited in passage 28, wherein:

the light absorbing and light emitting device further comprises at least a first stop, the first stop is attached to the first structure, and the first stop, the first structure, the first bracket and the holder are shaped, sized and oriented such that the first stop is prevented from passing through the first structure-retaining region upon sliding movement of the first structure relative to the first structure-retaining region.

Passage 30. A light absorbing and light emitting device as recited in passage 29, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, and the first stop is attached to the first edge.

Passage 31. A light absorbing and light emitting device as recited in passage 30, wherein:

the first stop extends from a first stop first end to a first stop second end, and at least one line segment that extends from the first stop first end to the first stop second end is substantially parallel to the holder cylindrical axis.

Passage 32. A light absorbing and light emitting device as recited in passage 28, wherein:

the light absorbing and light emitting device further comprises at least a first stop and a second stop, the first stop and the second stop are each attached to the first structure, the first stop, the second stop, the first structure, the first bracket and the holder are shaped, sized and oriented such that the first stop and the second stop are each prevented from passing through the first structure-retaining region upon sliding movement of the first structure relative to the first structure-retaining region, and the first stop is spaced from the second stop.

Passage 33. A light absorbing and light emitting device as recited in passage 32, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, the first stop is attached to the first edge, and the second stop is attached to the second edge.

Passage 34. A light absorbing and light emitting device as recited in any one of passages 22-33, wherein the holder is rotatable about a first holder axis.

Passage 35. A light absorbing and light emitting device as recited in passage 34, wherein rotating the holder about the first holder axis causes the first structure to wrap around the holder.

Passage 36. A light absorbing and light emitting device as recited in passage 34, wherein:

the light absorbing and light emitting device further comprises a spring-loading element, and the spring-loading element, when actuated, causes the holder to rotate about the first holder axis, which causes at least part of the first structure to wrap around the holder.

Passage 37. A light absorbing and light emitting device as recited in passage 36, wherein actuating the spring-loading element causes the holder to rotate about the first holder axis until at least 75 percent of the first structure is wrapped around the holder.

Passage 38. A light absorbing and light emitting device as recited in passage 36 or passage 37, wherein the spring-loading element can be actuated by applying force to the first structure.

Passage 39. A light absorbing and light emitting device as recited in any one of passages 22-38, wherein:

the holder is substantially cylindrical, the holder comprises a holder cylindrical axis, and the holder is rotatable about the holder cylindrical axis.

Passage 40. A light absorbing and light emitting device as recited in passage 39, wherein rotating the holder about the first holder axis causes the first structure to wrap around the holder.

Passage 41. A light admitting, light absorbing and light emitting assembly, comprising:

a first light-transmitting structure, a first structure; and a holder, the holder is fixed relative to the first light-transmitting structure, the first structure is supported by the holder, at least a first portion of the first structure has a first side, the first portion of the first structure comprises at least one phosphorescent material and/or at least one phase change material, the first structure is movable relative to the holder at least between a first structure first position and a first structure second position, in the first structure first position, the first side of the first portion faces the first light-transmitting structure, and in the first structure second position, the first side of the first portion faces away from the first light-transmitting structure.

Passage 42. A light admitting, light absorbing and light emitting device as recited in passage 41, wherein:

the first structure further comprises a second side, and a planar surface defined by the first side is substantially parallel to a planar surface defined by the second side.

Passage 43. A light admitting, light absorbing and light emitting device as recited in passage 41 or passage 42, wherein at least a first portion of the first structure is flexible and sheet-like.

Passage 44. A light admitting, light absorbing and light emitting device as recited in any one of passages 41-43, wherein the first portion of the first structure prevents at least some light from passing through the first portion of the first structure.

Passage 45. A light admitting, light absorbing and light emitting device as recited in any one of passages 41-44, wherein the holder is substantially cylindrical.

Passage 46. A light admitting, light absorbing and light emitting device as recited in any one of passages 41-45, wherein the first side of the first portion is substantially parallel to a surface of the first light-transmitting structure.

Passage 47. A light admitting, light absorbing and light emitting device as recited in any one of passages 41-46, wherein the first light-transmitting structure comprises glass.

Passage 48. A light admitting, light absorbing and light emitting device as recited in any one of passages 41-47, wherein the first light-transmitting structure is part of a window.

Passage 49. A light admitting, light absorbing and light emitting device as recited in any one of passages 41-47, wherein the first light-transmitting structure is part of a door.

Passage 50. A light admitting, light absorbing and light emitting device as recited in any one of passages 41-49, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, and the first edge and the second edge are substantially parallel to the holder cylindrical axis.

Passage 51. A light admitting, light absorbing and light emitting device as recited in passage 50, wherein the first edge is substantially perpendicular to the third edge.

Passage 52. A light admitting, light absorbing and light emitting device as recited in passage 50 or passage 51, wherein the holder cylindrical radius is a distance that is not more than 5 percent of a largest dimension of the first structure.

Passage 53. A light admitting, light absorbing and light emitting device as recited in any one of passages 41-52, wherein:

the light absorbing and light emitting device further comprises at least a first bracket, and the first bracket and the holder define a first structure-retaining region through which the first structure extends and in which it is slidably retained.

Passage 54. A light admitting, light absorbing and light emitting device as recited in passage 53, wherein:

the light absorbing and light emitting device further comprises at least a first stop, the first stop is attached to the first structure, and the first stop, the first structure, the first bracket and the holder are shaped, sized and oriented such that the first stop is prevented from passing through the first structure-retaining region upon sliding movement of the first structure relative to the first structure-retaining region.

Passage 55. A light admitting, light absorbing and light emitting device as recited in passage 54, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, and the first stop is attached to the first edge.

Passage 56. A light admitting, light absorbing and light emitting device as recited in passage 55, wherein:

the first stop extends from a first stop first end to a first stop second end, and at least one line segment that extends from the first stop first end to the first stop second end is substantially parallel to the holder cylindrical axis.

Passage 57. A light admitting, light absorbing and light emitting device as recited in passage 53, wherein:

the light absorbing and light emitting device further comprises at least a first stop and a second stop, the first stop and the second stop are each attached to the first structure, the first stop, the second stop, the first structure, the first bracket and the holder are shaped, sized and oriented such that the first stop and the second stop are each prevented from passing through the first structure-retaining region upon sliding movement of the first structure relative to the first structure-retaining region, and the first stop is spaced from the second stop.

Passage 58. A light admitting, light absorbing and light emitting device as recited in passage 57, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, the first stop is attached to the first edge, and the second stop is attached to the second edge.

Passage 59. A light admitting, light absorbing and light emitting device as recited in any one of passages 41-58, wherein the holder is rotatable about a first holder axis.

Passage 60. A light admitting, light absorbing and light emitting device as recited in passage 59, wherein rotating the holder about the first holder axis causes the first structure to wrap around the holder.

Passage 61. A light admitting, light absorbing and light emitting device as recited in passage 59 or passage 60, wherein:

the light absorbing and light emitting device further comprises a spring-loading element, and the spring-loading element, when actuated, causes the holder to rotate about the first holder axis, which causes at least part of the first structure to wrap around the holder.

Passage 62. A light admitting, light absorbing and light emitting device as recited in passage 61, wherein actuating the spring-loading element causes the holder to rotate about the first holder axis until at least 75 percent of the first structure is wrapped around the holder.

Passage 63. A light admitting, light absorbing and light emitting device as recited in passage 61 or passage 62, wherein the spring-loading element can be actuated by applying force to the first structure.

Passage 64. A light admitting, light absorbing and light emitting device as recited in any one of passages 41-63, wherein:

the holder is substantially cylindrical, the holder comprises a holder cylindrical axis, and the holder is rotatable about the holder cylindrical axis.

Passage 65. A light admitting, light absorbing and light emitting device as recited in passage 64, wherein rotating the holder about the first holder axis causes the first structure to wrap around the holder.

Passage 66. A method of absorbing light and emitting light, comprising:

moving a first structure from a first structure first position to a first structure second position, the first structure is supported by a holder, at least a first portion of the first structure has a first side, the first portion of the first structure comprises at least one phosphorescent material and/or at least one phase change material, in the first structure first position, the first side of the first portion faces a first direction, in the first structure second position, the first side of the first portion faces a second direction, and the first direction differs from the second direction.

Passage 67. A method as recited in passage 66, wherein the first direction is substantially opposite to the second direction.

Passage 68. A method as recited in passage 66 or passage 67, wherein at least the first portion of the first structure is flexible and sheet-like.

Passage 69. A method as recited in any one of passages 66-68, wherein the first portion of the first structure prevents at least some light from passing through the first portion of the first structure.

Passage 70. A method as recited in any one of passages 66-69, wherein the holder is substantially cylindrical.

Passage 71. A method as recited in any one of passages 66-70, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, and the first edge and the second edge are substantially parallel to the holder cylindrical axis.

Passage 72. A method as recited in passage 71, wherein the first edge is substantially perpendicular to the third edge.

Passage 73. A method as recited in passage 71 or passage 72, wherein the holder cylindrical radius is a distance that is not more than 5 percent of a largest dimension of the first structure.

Passage 74. A method as recited in any one of passages 66-73, wherein a first bracket and the holder define a first structure-retaining region through which the first structure extends and in which it is slidably retained.

Passage 75. A method as recited in passage 74, wherein:

a first stop is attached to the first structure, and the first stop, the first structure, the first bracket and the holder are shaped, sized and oriented such that the first stop is prevented from passing through the first structure-retaining region upon sliding movement of the first structure relative to the first structure-retaining region.

Passage 76. A method as recited in passage 75, wherein the method further comprises sliding the first structure relative to the first structure-retaining region such that the first stop moves along a first stop movement path until the first stop comes into contact with the first bracket, thereby preventing the first structure from being slid farther in a way that would cause the first stop to move beyond the location where it contacts the first bracket.

Passage 77. A method as recited in passage 75 or passage 76, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, and the first stop is attached to the first edge.

Passage 78. A method as recited in passage 77, wherein:

the first stop extends from a first stop first end to a first stop second end, and at least one line segment that extends from the first stop first end to the first stop second end is substantially parallel to the holder cylindrical axis.

Passage 79. A method as recited in passage 74, wherein:

a first stop and a second stop are each attached to the first structure, the first stop, the second stop, the first structure, the first bracket and the holder are shaped, sized and oriented such that the first stop and the second stop are each prevented from passing through the first structure-retaining region upon sliding movement of the first structure relative to the first structure-retaining region, and the first stop is spaced from the second stop.

Passage 80. A method as recited in passage 79, wherein the method further comprises:

sliding the first structure relative to the first structure-retaining region such that the first stop moves along at least part of a first stop movement path that extends until the first stop comes into contact with the first bracket, thereby preventing the first structure from being slid farther in a way that would cause the first stop to move beyond the location where it contacts the first bracket, and then sliding the first structure relative to the first structure-retaining region such that the second stop moves along at least part of a second stop movement path that extends until the second stop comes into contact with the first bracket, thereby preventing the first structure from being slid farther in a way that would cause the second stop to move beyond the location where it contacts the first bracket.

Passage 81. A method as recited in passage 79 or passage 80, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, the first stop is attached to the first edge, and the second stop is attached to the second edge.

Passage 82. A method as recited in any one of passages 66-81, wherein the holder is rotatable about a first holder axis.

Passage 83. A method as recited in passage 82, wherein the method further comprises actuating a spring-loading element, which causes the holder to rotate about the first holder axis, which causes at least part of the first structure to wrap around the holder.

Passage 84. A method as recited in passage 83, wherein said actuating the spring-loading element causes the holder to rotate about the first holder axis until at least 75 percent of the first structure is wrapped around the holder.

Passage 85. A method as recited in passage 83 or passage 84, wherein the method further comprises applying force to the first structure to actuate the spring-loading element.

Passage 86. A method as recited in passage 82, wherein the method further comprises rotating the holder about the first holder axis, thereby causing the first structure to wrap around the holder.

Passage 87. A method as recited in passage 86, wherein:

the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, the first edge and the second edge are substantially perpendicular to the third edge and the fourth edge, and the method comprises rotating the holder about the first holder axis to an extent that at least 50 percent of the third edge and the fourth edge are wrapped around the holder.

Passage 88. A method as recited in passage 87, wherein the holder is substantially cylindrical.

Passage 89. A method as recited in passage 82, wherein the method further comprises applying force to the first structure, thereby actuating a spring-loading element, thereby causing the holder to rotate about the first holder axis, which causes the first structure to wrap around the holder.

Passage 90. A method as recited in any one of passages 66-89, wherein:

the holder is substantially cylindrical, the holder comprises a holder cylindrical axis, and the holder is rotatable about the holder cylindrical axis.

Passage 91. A method as recited in passage 90, wherein the method further comprises rotating the holder about the first holder axis, thereby causing the first structure to wrap around the holder.

Passage 92. A light absorbing and light emitting device, comprising:

a plurality of first structures; and a holder assembly, each of the first structures is supported by the holder assembly, for each of the first structures:

at least a first portion of the first structure has a first side, the first portion of the first structure comprises at least one phosphorescent material and/or at least one phase change material, the first structure is movable relative to the holder assembly at least between a first structure first position and a first structure second position, in the first structure first position, the first side of the first portion faces a first direction, in the first structure second position, the first side of the first portion faces a second direction, and the first direction differs from the second direction.

Passage 93. A light absorbing and light emitting device as recited in passage 92, wherein at least two of the plurality of first structures have respective first sides that define respective planes that are substantially parallel to each other.

Passage 94. A light absorbing and light emitting device as recited in passage 92 or passage 93, wherein the plurality of first structures have respective first sides that define respective planes that are substantially parallel to each other.

Passage 95. A light absorbing and light emitting device as recited in any one of passages 92-94, wherein at least two of the plurality of first structures have substantially no space between them.

Passage 96. A light absorbing and light emitting device as recited in any one of passages 92-95, wherein:

at least two of the first structures each comprises a first edge, a second edge, a third edge and a fourth edge, for each of the at least two first structures, a perimeter of the first side is defined by the first edge, the second edge, the third edge and the fourth edge of such first structure, for each of the at least two first structures, the first edge is substantially parallel to the second edge, for each of the at least two first structures, the first edge and the second edge are each at least 5 times as long as the third edge for such first structure and at least 5 times as long as the fourth edge for such first structure, for each of the at least two first structures, there is substantially no space between the first edge and a first edge of an adjacent first structure, and for each of the at least two first structures, there is substantially no space between the second edge and a second edge of an adjacent first structure.

Passage 97. A light absorbing and light emitting device as recited in any one of passages 92-96, wherein:

each of the first structures comprises a first edge, a second edge, a third edge and a fourth edge, for each of the first structures, a perimeter of the first side is defined by the first edge, the second edge, the third edge and the fourth edge of such first structure, for each of the first structures, the first edge is substantially parallel to the second edge, for each of the first structures, the first edge and the second edge are each at least 5 times as long as the third edge for such first structure and at least 5 times as long as the fourth edge for such first structure, for each of the first structures, there is substantially no space between the first edge and a first edge of an adjacent first structure, and for each of the first structures, there is substantially no space between the second edge and a second edge of an adjacent first structure.

Passage 98. A light absorbing and light emitting device as recited in passage 97, wherein because for each of the first structures, there is substantially no space between the first edge and a first edge of an adjacent first structure and there is substantially no space between the second edge and a second edge of an adjacent first structure, substantially no light is absorbed by any phosphorescent material and/or any phase change material on any of the first structures, and therefore substantially no light is emitted by any phosphorescent material and/or any phase change material on any of the first structures.

Passage 99. A light absorbing and light emitting device as recited in any one of passages 92-98, wherein:

each of the first structures comprises a first edge, a second edge, a third edge and a fourth edge, for each of the first structures:

the first edge is substantially parallel to the second edge, the third edge is substantially parallel to the fourth edge, and the first edge and the second edge are substantially parallel to an axis that extends along a length of the holder assembly.

Passage 100. A light absorbing and light emitting device as recited in passage 99, wherein for each of the first structures, the first edge is substantially perpendicular to the third edge.

Passage 101. A light absorbing and light emitting device as recited in passage 99 or passage 100, wherein for each of the first structures, the first edge and the second edge are at least five times as large as the third edge and the fourth edge.

Passage 102. A light absorbing and light emitting device as recited in any one of passages 99-101, wherein for each of the first structures, the first edge and the second edge are at least ten times as large as the third edge and the fourth edge.

Passage 103. A light absorbing and light emitting device as recited in any one of passages 99-102, wherein for each of the first structures, the first edge and the second edge are at least twenty times as large as the third edge and the fourth edge.

Passage 104. A light absorbing and light emitting device as recited in any one of passages 98-103, wherein for each first structure, the first portion of the first structure prevents at least some light from passing through the first portion of the first structure.

Passage 105. A light absorbing and light emitting device as recited in any one of passages 98-104, wherein:

the holder assembly comprises at least first and second strands, and for each of the first structures:

the first strand comprises a first support region, the second strand comprises a second support region, and the first support region and the second support region can be tilted to move the first structure between the first structure first position and the first structure second position.

Passage 106. A light absorbing and light emitting device as recited in passage 105, wherein:

the holder assembly further comprises a holder and a third strand, the third strand comprises a third support region, the third support region can be moved relative to the holder to alter a distance between the holder and the third support region between a first distance and a second distance, the second distance longer than the first distance, and with the third support region the first distance from the holder, at least two of the first structures are in close proximity.

Passage 107. A light absorbing and light emitting device as recited in passage 105 or passage 106, wherein:

at least two of the first structures each comprises a first edge, a second edge, a third edge and a fourth edge, for each of the at least two first structures, a perimeter of the first side is defined by the first edge, the second edge, the third edge and the fourth edge of such first structure, for each of the at least two first structures, the first edge is substantially parallel to the second edge, for each of the at least two first structures, the first edge and the second edge are each at least 5 times as long as the third edge for such first structure and at least 5 times as long as the fourth edge for such first structure, for each of the at least two first structures, there is substantially no space between the first edge and a first edge of an adjacent first structure, for each of the at least two first structures, there is substantially no space between the second edge and a second edge of an adjacent first structure, the holder assembly further comprises a holder and a third strand, the third strand comprises a third support region, the third support region can be moved relative to the holder to alter a distance between the holder and the third support region between a first distance and a second distance, the second distance longer than the first distance, and with the third support region the first distance from the holder, the respective first, second, third and fourth edges of the at least two of the first structures are in close proximity.

Passage 108. A light absorbing and light emitting device as recited in any one of passages 105-107, wherein:

the holder assembly further comprises a tilt actuator, and actuating the tilt actuator causes the first support region and the second support region for each of the first structures to tilt, thereby causing each of the first structures to move between its first structure first position and its first structure second position.

Passage 109. A light absorbing and light emitting device as recited in passage 108, wherein:

the holder assembly further comprises a third strand length altering actuator, and the third strand length altering actuator can be actuated to move the third support region to alter the distance between the holder and the third support region between the first distance and the second distance.

Any two or more structural parts of the devices described herein can be integrated. Any structural part of the devices described herein can be provided in two or more parts (which can bee held together, if necessary). Similarly, any two or more actions can be conducted simultaneously, and/or any action can be conducted in a series of actions.

The invention claimed is:

1. A light absorbing and light emitting device, comprising:

a first structure;

a holder;

at least a first bracket; and at least a first stop, the first structure is supported by the holder, at least a first portion of the first structure is flexible and sheet-like, the first portion of the first structure has a first side and a second side, the first portion of the first structure comprises at least one phosphorescent material or at least one phase change material, the first structure is movable relative to the holder at least between a first structure first position and a first structure second position, in the first structure first position, the first side of the first portion faces a first direction, in the first structure second position, the first side of the first portion faces a second direction, the first direction differs from the second direction, the first bracket and the holder define a first structure-retaining region through which the first structure extends and in which it is slidably retained, the first stop is attached to the first structure, and the first stop, the first structure, the first bracket and the holder are shaped, sized and oriented such that the first stop is prevented from passing through the first structure-retaining region upon sliding movement of the first structure relative to the first structure-retaining region.

2. A light absorbing and light emitting device as recited in claim 1, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, and the first stop is attached to the first edge.

3. A light absorbing and light emitting device as recited in claim 2, wherein:

the first stop extends from a first stop first end to a first stop second end, and at least one line segment that extends from the first stop first end to the first stop second end is substantially parallel to the holder cylindrical axis.

4. A light absorbing and light emitting device as recited in claim 1, wherein:

the at least a first stop further comprises a second stop, the second stop is attached to the first structure, and the first stop is spaced from the second stop.

5. A light absorbing and light emitting device as recited in claim 4, Wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, the first stop is attached to the first edge, and the second stop is attached to the second edge.

6. A light absorbing and light emitting device, comprising:

a first structure; and a holder, the first structure is supported by the holder, at least a first portion of the first structure has a first side, the first portion of the first structure comprises at least one phosphorescent material or at least one phase change material, the first structure is movable relative to the holder at least between a first structure first position and a first structure second position, in the first structure first position, the first side of the first portion faces a first direction, in the first structure second position, the first side of the first portion faces a second direction, the first direction differs from the second direction, the holder is rotatable about a first holder axis, and rotating the holder about the first holder axis causes the first structure to wrap completely around the holder in a plurality of windings.

7. A light absorbing and light emitting device as recited in claim 6, wherein the first direction is substantially opposite to the second direction.

8. A light absorbing and light emitting device as recited in claim 6, wherein the holder is substantially cylindrical.

9. A light absorbing and light emitting device as recited in claim 6, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, and the first edge and the second edge are substantially parallel to the holder cylindrical axis.

10. A light absorbing and light emitting device as recited in claim 9, wherein the first edge is substantially perpendicular to the third edge.

11. A light absorbing and light emitting device as recited in claim 9, wherein the holder cylindrical radius is a distance that is not more than 5 percent of a largest dimension of the first structure.

12. A light absorbing and light emitting device as recited in claim 6, wherein:

the light absorbing and light emitting device further comprises at least a first bracket, and the first bracket and the holder define a first structure-retaining region through Which the first structure extends and in which it is slidably retained.

13. A light absorbing and light emitting device as recited in claim 6, wherein:

the light absorbing and light emitting device further comprises a spring-loading element, and the spring-loading element, when actuated, causes the holder to rotate about the first holder axis, which causes at least part of the first structure to wrap around the holder.

14. A light absorbing and light emitting device as recited in claim 13, wherein actuating the spring-loading element causes the holder to rotate about the first holder axis until at least 75 percent of the first structure is wrapped around the holder.

15. A light absorbing and light emitting device as recited in claim 13, wherein the spring-loading element can be actuated by applying force to the first structure.

16. A light absorbing and light emitting device as recited in claim 6, wherein:

the holder is substantially cylindrical, the holder comprises a holder cylindrical axis, and the holder is rotatable about the holder cylindrical axis.

17. A light absorbing and light emitting device as recited in claim 16, wherein rotating the holder about the first holder axis causes the first structure to wrap around the holder.

18. A light absorbing and light emitting device, comprising:

a first structure;

a holder;

at least a first bracket; and at least a first stop, the first structure is supported by the holder, at least a first portion of the first structure has a first side, the first portion of the first structure comprises at least one phosphorescent material or at least one phase change material, the first structure is movable relative to the holder at least between a first structure first position and a first structure second position, in the first structure first position, the first side of the first portion faces a first direction, in the first structure second position, the first side of the first portion faces a second direction, the first direction differs from the second direction, the first bracket and the holder define a first structure-retaining region through which the first structure extends and in which it is slidably retained, the first stop is attached to the first structure, and the first stop, the first structure, the first bracket and the holder are shaped, sized and oriented such that the first stop is prevented from passing through the first structure-retaining region upon sliding movement of the first structure relative to the first structure-retaining region.

19. A light absorbing and light emitting device as recited in claim 18, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, and the first stop is attached to the first edge.

20. A light absorbing and light emitting device as recited in claim 19, wherein:

the first stop extends from a first stop first end to a first stop second end, and at least one line segment that extends from the first stop first end to the first stop second end is substantially parallel to the holder cylindrical axis.

21. A light absorbing and light emitting device as recited in claim 18, wherein:

the at least a first stop further comprises a second stop, the second stop is attached to the first structure, and the first stop is spaced from the second stop.

22. A light absorbing and light emitting device as recited in claim 21, wherein:

the holder is substantially in the shape of a cylinder having a holder cylindrical axis and a holder cylindrical radius, the first structure comprises a first edge, a second edge, a third edge and a fourth edge, the first edge is substantially parallel to the second edge, the third edge is substantially parallel to the fourth edge, the first edge and the second edge are substantially parallel to the holder cylindrical axis, the first stop is attached to the first edge, and the second stop is attached to the second edge.

* * * * *